(12) United States Patent
Hasebe et al.

(10) Patent No.: US 12,001,076 B2
(45) Date of Patent: Jun. 4, 2024

(54) LENS MODULE, CAMERA MODULE, ELECTRONIC DEVICE, AND LENS DRIVE METHOD

(71) Applicant: SONY SEMICONDUCTOR SOLUTIONS CORPORATION, Kanagawa (JP)

(72) Inventors: Kazunori Hasebe, Kanagawa (JP); Tatsuo Kuroiwa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 836 days.

(21) Appl. No.: 17/047,108

(22) PCT Filed: Mar. 6, 2019

(86) PCT No.: PCT/JP2019/008962
§ 371 (c)(1),
(2) Date: Oct. 13, 2020

(87) PCT Pub. No.: WO2019/207967
PCT Pub. Date: Oct. 31, 2019

(65) Prior Publication Data
US 2021/0080685 A1 Mar. 18, 2021

(30) Foreign Application Priority Data
Apr. 25, 2018 (JP) ................. 2018-084225

(51) Int. Cl.
*G02B 7/09* (2021.01)
*G03B 13/36* (2021.01)
(52) U.S. Cl.
CPC ............... *G02B 7/09* (2013.01); *G03B 13/36* (2013.01)

(58) Field of Classification Search
CPC ...... G02B 27/46; G02B 27/64; G02B 27/646; G02B 7/08; G02B 7/09; G02B 7/02;
(Continued)

(56) References Cited

U.S. PATENT DOCUMENTS

| 2012/0154614 A1 | 6/2012 | Moriya et al. |
| 2016/0316121 A1 | 10/2016 | Park |
| 2017/0299408 A1 | 10/2017 | Kang et al. |

FOREIGN PATENT DOCUMENTS

| CN | 102472944 A | 5/2012 |
| CN | 106067939 A | 11/2016 |

(Continued)

OTHER PUBLICATIONS

International Search Report and Written Opinion of PCT Application No. PCT/JP2019/008962, dated May 28, 2019, 09 pages of ISRWO.

*Primary Examiner* — Jie Lei
(74) *Attorney, Agent, or Firm* — CHIP LAW GROUP

(57) ABSTRACT

To provide, with an inexpensive construction, a lens module which does not require an individual adjustment of positions during mass production and which enables a degree of freedom of arrangement in a set to be improved. The lens module includes: a lens; a lens tube which has a central axis that is parallel to an optical axis of the lens and which is configured to hold the lens inside; a casing configured to house the lens tube inside; a first coil which is provided so as to circle around an outer circumferential surface of the lens tube; a magnet which is provided on an inner circumferential surface of the casing so as to oppose the first coil; and a second coil which is provided so as to circle around the inner circumferential surface of the casing.

9 Claims, 18 Drawing Sheets

(58) Field of Classification Search
CPC . G02B 7/04; G02B 7/102; G03B 5/00; G03B 13/36; G03B 30/00; G03B 3/10; G03B 2205/0046; G03B 2205/0069; G03B 2217/005; G11B 7/0932; G11B 7/0935; G11B 23/00; H04N 5/225; H04N 5/232; H04N 5/23248; H04N 5/2257; H04N 5/2328
USPC ....... 359/824, 823, 813, 814, 819, 554, 557; 369/52–55
See application file for complete search history.

(56) References Cited

FOREIGN PATENT DOCUMENTS

| | | |
|---|---|---|
| CN | 109076149 A | 12/2018 |
| EP | 2469333 A1 | 6/2012 |
| EP | 3086154 A1 | 10/2016 |
| IN | 206177227 U | 5/2017 |
| JP | 2010-281969 A | 12/2010 |
| JP | 2011-022562 A | 2/2011 |
| JP | 2015-111299 A | 6/2015 |
| KR | 10-2016-0126587 A | 11/2016 |
| KR | 10-2017-0118577 A | 10/2017 |
| WO | 2011/021559 A1 | 2/2011 |
| WO | 2017/179803 A1 | 10/2017 |

LENS MODULE, CAMERA MODULE, ELECTRONIC DEVICE, AND LENS DRIVE METHOD

CROSS REFERENCE TO RELATED APPLICATIONS

This application is a U.S. National Phase of International Patent Application No. PCT/JP2019/008962 filed on Mar. 6, 2019, which claims priority benefit of Japanese Patent Application No. JP 2018-084225 filed in the Japan Patent Office on Apr. 25, 2018. Each of the above-referenced applications is hereby incorporated herein by reference in its entirety.

TECHNICAL FIELD

A technique according to the present disclosure (a present technique) relates to a lens module, a camera module, an electronic device, and a lens drive method.

BACKGROUND ART

Many imaging apparatuses such as digital cameras are mounted with an autofocus (AF) function for automatically bringing a subject into focus. In the AF function, a lens is moved in an optical axis direction by an actuator to control a focal length. A voice coil motor (VCM) is used as an actuator for moving a lens. A VCM is constituted by a coil (a voice coil) and a magnet and, when a current is applied to the coil, the coil moves in a straight line in a magnetic field of the magnet and enables a position of the lens to be controlled.

Drive systems of a VCM include an open loop system and a feedback system (a closed loop system). Among these systems, the feedback system realizes a higher speed than the open loop system by detecting a position of the lens and feeding back the detected position of the lens to a driver circuit. As a position sensor for detecting the position of a lens, a Hall element or a magnetoresistance effect (MR) element is generally used (refer to PTL 1).

CITATION LIST

Patent Literature

[PTL 1]
JP 2011-22562A

SUMMARY

Technical Problem

However, the use of a Hall element as a position sensor requires a strong magnet, and providing magnetic shielding disrupts normal operations. This forces the position sensor to be used in a state where a magnetic flux of the magnet leaks outside of a module and limits a position inside a set for assembling the module. In addition, an individual adjustment of positions is required during mass production. On the other hand, when using an MR element as a position sensor, the MR element is more expensive than a Hall element and, in a similar manner to the Hall element, an individual adjustment of positions is required during mass production.

In consideration of the problems described above, an object of the present technique is to provide, with an inexpensive construction, a lens module, a camera module, an electronic device, and a lens drive method which do not require an individual adjustment of positions during mass production and which improve a degree of freedom of arrangement in a set.

Solution to Problem

An aspect of the present technique is a lens module including: a lens; a lens tube which has a central axis that is parallel to an optical axis of the lens and which is configured to hold the lens inside; a casing configured to house the lens tube inside; a first coil which is provided so as to circle around an outer circumferential surface of the lens tube; a magnet which is provided on an inner circumferential surface of the casing so as to oppose the first coil; and a second coil which is provided so as to circle around the inner circumferential surface of the casing. According to this aspect, since an induced electromotive force of the second coil varies in accordance with a distance between the first coil and the second coil, a position of the lens can be detected by detecting the induced electromotive force of the second coil.

Another aspect of the present technique is a camera module including: a lens; a lens tube which has a central axis that is parallel to an optical axis of the lens and which is configured to hold the lens inside; a casing configured to house the lens tube inside; a first coil which is provided so as to circle around an outer circumferential surface of the lens tube; a magnet which is provided on an inner circumferential surface of the casing so as to oppose the first coil; a second coil which is provided so as to circle around the inner circumferential surface of the casing; and an imaging element which is arranged on the optical axis and which is configured to convert light having been transmitted through the lens into an electric signal. According to this aspect, since an induced electromotive force of the second coil varies in accordance with a distance between the first coil and the second coil, a position of the lens with respect to the imaging element can be detected by detecting the induced electromotive force of the second coil.

Yet another aspect of the present technique is an electronic device including: a lens; a lens tube which has a central axis that is parallel to an optical axis of the lens and which is configured to hold the lens inside; a casing configured to house the lens tube inside; a first coil which is provided so as to circle around an outer circumferential surface of the lens tube; a magnet which is provided on an inner circumferential surface of the casing so as to oppose the first coil; a second coil which is provided so as to circle around the inner circumferential surface of the casing; an imaging element which is arranged on the optical axis and which is configured to convert light having been transmitted through the lens into an electric signal; and a control portion which is configured to supply a current to the first coil and to control a position of the lens along the optical axis based on an induced electromotive force of the second coil. According to this aspect, since an induced electromotive force of the second coil varies in accordance with a distance between the first coil and the second coil, a position of the lens with respect to the imaging element can be detected by detecting the induced electromotive force of the second coil.

Still another aspect of the present technique is a lens drive method including the steps of: in accordance with a magnetic interaction between a first coil which is provided so as to circle around an outer circumferential surface of a lens tube that holds a lens inside and a magnet which is provided so as to oppose the first coil on an inner circumferential surface of a casing that holds the lens tube inside, moving the lens tube along an optical axis of the lens; detecting an induced electromotive force of a second coil that is provided so as to circle around the inner circumferential surface of the casing; and controlling a current value to be supplied to the first coil based on the detected induced electromotive force. According to this aspect, since an induced electromotive force of the second coil varies in accordance with a distance between the first coil and the second coil, a position of the lens can be detected by detecting the induced electromotive force of the second coil.

It should be noted that the advantageous effects described above are not necessarily restrictive and any of the advantageous effects described in the present disclosure may apply. The advantageous effects described in the present specification are merely exemplary and are not restrictive, and other advantageous effects may be produced.

DESCRIPTION OF EMBODIMENTS

Hereinafter, an embodiment of the present technique will be described with reference to drawings. In the descriptions of the drawings to be referred to hereinafter, same or similar portions are denoted by same or similar reference signs. However, it should be noted that the drawings are schematic and relationships between thicknesses and plan view dimensions, ratios of thicknesses of respective layers, and the like differ from those in reality. Therefore, specific thicknesses and dimensions should be determined by taking the following description into consideration. In addition, it is needless to say that drawings include portions where dimensional relationships and ratios differ between the drawings.

In addition, it is to be understood that definitions of directions such as up-down in the following descriptions are merely definitions provided for the sake of brevity and are not intended to limit the technical ideas of the present technique. For example, it is obvious that when an object is observed after being rotated by 90 degrees, up-down is converted into and interpreted as left-right, and when an object is observed after being rotated by 180 degrees, up-down is interpreted as being inverted.

(Electronic Device)

Figure 1:
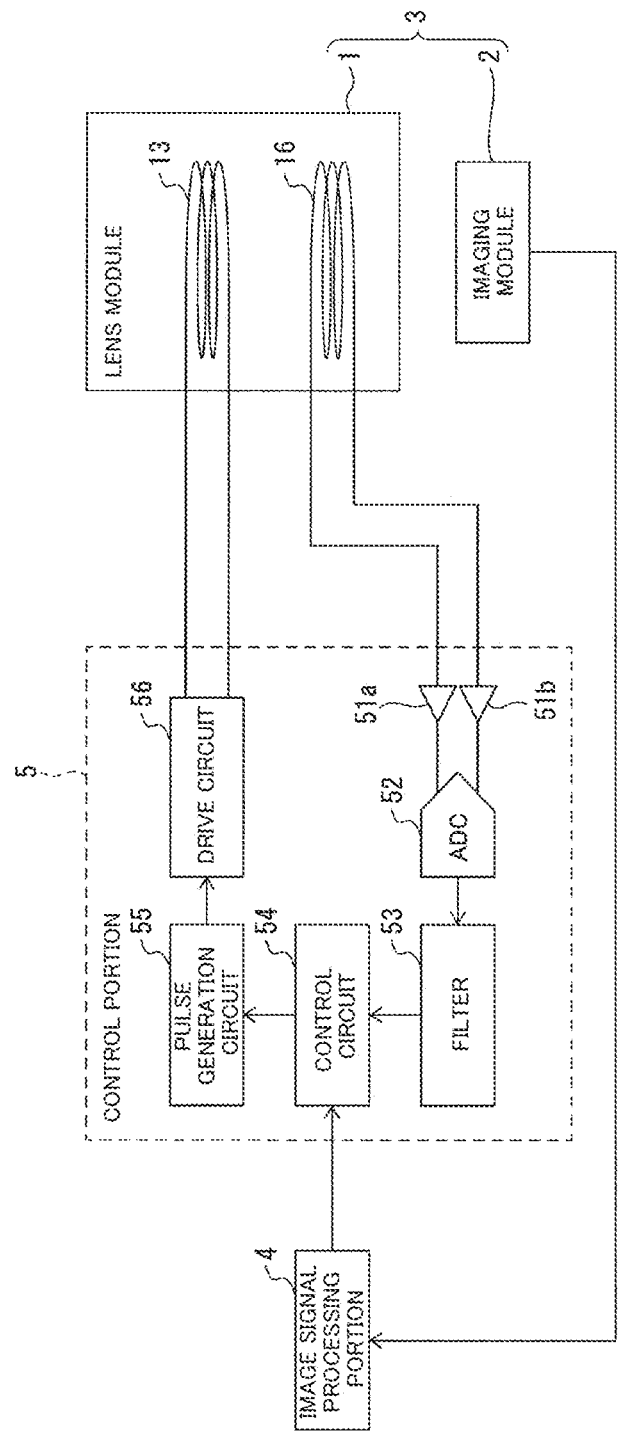
FIG. 1 is a block diagram showing an example of an electronic device according to an embodiment of the present technique.

As shown in FIG. 1, an electronic device according to the embodiment of the present technique includes a camera module 3, an image signal processing portion 4, and a control portion 5. The camera module 3 includes a lens module 1 and an imaging module (an imaging portion) 2.

Figure 2:
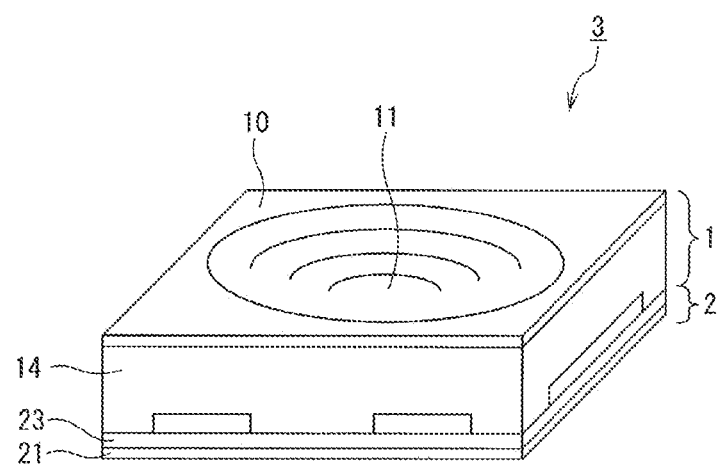
FIG. 2 is a perspective view showing an example of a camera module according to the embodiment of the present technique.

FIG. 2 shows a perspective view of a configuration of the camera module 3. As shown in FIG. 2, the camera module 3 includes the imaging module 2 and the lens module 1 being arranged on top of the imaging module 2. The lens module 1 has a casing 14 and a cover 10 being arranged on top of the casing 14. A lens unit 11 is exposed in an opening at a center of the cover 10. The imaging module 2 has a substrate 21 and a cover holder 23.

Figure 3:
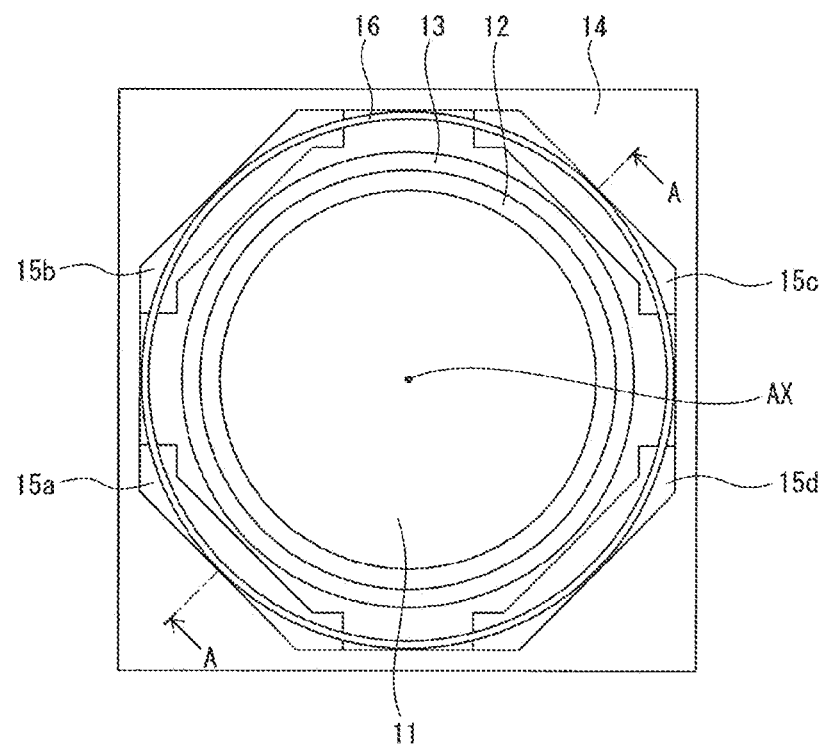
FIG. 3 is a top view showing the example of the camera module according to the embodiment of the present technique.
Figure 4:
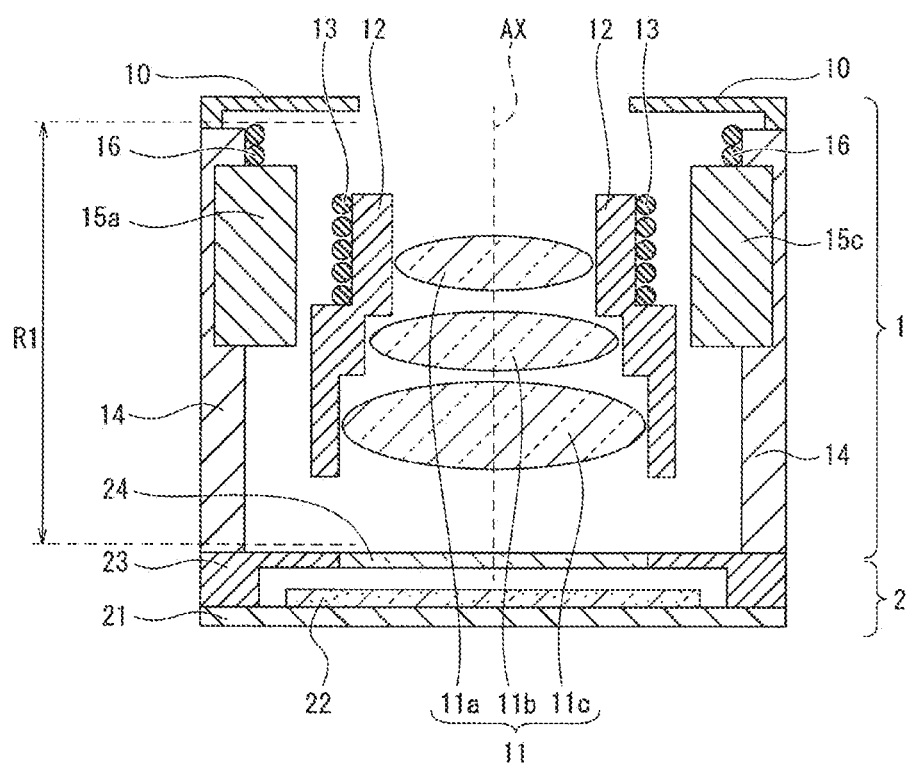
FIG. 4 is a sectional view showing the example of the camera module according to the embodiment of the present technique.

FIG. 3 is a top view in which the cover 10 of the camera module 3 shown in FIG. 2 has been omitted, and a sectional view taken along portion A-A shown in FIG. 3 corresponds to FIG. 4. As shown in FIG. 4, for example, the lens unit 11 is constituted by a plurality of (three) lenses 11a, 11b, and 11c. Symmetry, a type, an aperture, and the like of the lenses that constitute the lens unit 11 are not limited. The number of lenses that constitute the lens unit 11 is similarly not limited, and the lens unit 11 may be constituted by a single lens or by two or more or four or more lenses. An optical axis AX of the lens unit 11 is an optical axis that is shared among the lenses 11a, 11b, and 11c.

As shown in FIGS. 3 and 4, the lens unit 11 is held inside a cylindrical lens tube (lens barrel) 12 and is fixed to the lens tube 12 by an adhesive or the like. The lens tube 12 has a central axis that is parallel to the optical axis AX of the lens unit 11. While a case where an inside side surface (an inner circumferential surface) and an outside side surface (an outer circumferential surface) of the lens tube 12 have a stepped portion is exemplified in FIG. 4, a shape of the lens tube 12 is not limited thereto. For example, a non-magnetic material such as a metal or a resin can be used as the lens tube 12.

A first coil (a drive coil) 13 is provided on the outer circumferential surface of the lens tube 12. In a structure exemplified in FIGS. 3 and 4, the first coil 13 is arranged on the outer circumferential surface of an upper part of the lens tube 12 with a relatively small outer diameter. The first coil 13 is wound so as to circle the outer circumferential surface of the lens tube 12 and is fixed to the lens tube 12. Alternatively, a sheet or the like made of a magnetic body such as ferrite may be inserted between the first coil 13 and the lens tube 12. The number of turns, a coil diameter, a line diameter, a shape, and the like of the first coil 13 are not limited.

An integrated movable part (11, 12, and 13) is constituted by the lens unit 11, the lens tube 12, and the first coil 13. The movable part (11, 12, and 13) is relatively movable with respect to the casing 14 in a direction (an optical axis direction) along the optical axis AX of the lens unit 11.

As shown in FIGS. 3 and 4, the boxlike casing 14 that houses the lens tube 12 inside is provided. The casing 14 is arranged separated from the lens tube 12 and the first coil 13 so as to surround a periphery of the outer circumferential surface of the lens tube 12. The casing 14 is provided with a columnar hollow part (space) with the optical axis AX of the lens unit 11 as a central axis, and the movable part (11, 12, and 13) is housed in the hollow part. For the casing 14, a metal material or the like having a magnetic shielding effect such as stainless steel can be used. The casing 14 need only be structured so as to be capable of housing the lens tube 12 inside and is not limited to a boxlike structure. For example, a cylindrical structure or a structure constituted by a plurality of walls may be adopted.

While a case has been exemplified where the casing 14 has an annularly continuous shape in a plan view as shown in FIG. 3, the casing 14 is not limited thereto and may be configured in any way as long as the casing 14 has a hollow part capable of housing the movable part (11, 12, and 13) inside. For example, the casing may be constituted by a plurality of members provided separated from each other so as to surround the movable part (11, 12, and 13). In addition, a shape of the hollow part of the casing 14 for housing the movable part (11, 12, and 13) is also not limited to a columnar shape and may be a prismatic shape or the like.

A plurality of (four) magnets 15a, 15b, 15c, and 15d are arranged inside the casing 14 and are fixed to the inside of the casing 14. The magnets 15a, 15b, 15c, and 15d are arranged separated from the first coil 13 so as to oppose the first coil 13 in a direction that is perpendicular to the optical axis AX. As shown in FIG. 3, the magnets 15a, 15b, 15c, and 15d are separated at regular intervals at positions that are approximately four-fold symmetric with respect to the optical axis AX as a rotational axis along an inner wall of the casing 14. For example, the magnets 15a, 15b, 15c, and 15d are arranged such that N poles thereof face a side of the first coil 13 and S poles thereof face a side of the casing 14.

As the magnets 15a, 15b, 15c, and 15d, a permanent magnet or the like can be used and, as a permanent magnet, a rare-earth magnet such as a neodymium magnet, an alnico magnet, or the like can be used. While four magnets 15a, 15b, 15c, and 15d with a same shape are exemplified in FIGS. 3 and 4, the number and shapes of the magnets are not limited. For example, a single magnet with an annular shape in a plan view may be provided.

The magnets 15a, 15b, 15c, and 15d and the first coil 13 constitute a VCM that is a direct-acting actuator (a linear actuator). An interaction of magnetic fluxes of the first coil 13 and the magnets 15a, 15b, 15c, and 15d when a current is supplied to the first coil 13 enables the movable part (11, 12, and 13) to move in a straight line along the optical axis AX of the lens unit 11. The movable part (11, 12, and 13) moves in a movable region R1 along the optical axis AX of the lens unit 11. The movable region R1 along the optical axis AX of the movable part (11, 12, and 13) is defined between a first state where the movable part (11, 12, and 13) has moved upward (a side of a subject) the most and a second state where the movable part (11, 12, and 13) has moved downward (a side of an imaging element 22) that is an opposite side to the side of the subject the most. The first state is a state where the movable part (11, 12, and 13) has moved to an upper end of the movable region R1 during macro photography. The second state is a state where the movable part (11, 12, and 13) has moved to a lower end of the movable region R1 during long distance photography.

An elastic body (not illustrated) such as a leaf spring is attached to the magnets 15a, 15b, 15c, and 15d or the casing 14. Due to the elastic body such as a leaf spring, the movable part (11, 12, and 13) is suspended inside the casing 14 and supported so as to be movable along the optical axis AX.

The structure exemplified in FIGS. 3 and 4 adopts a moving coil system in which the magnets 15a, 15b, 15c, and 15d are fixed to the side of the casing 14, the first coil 13 is fixed to the side of the lens unit 11, and the first coil 13 is moved together with the lens unit 11. The moving coil system shown in FIGS. 3 and 4 enables a weight of the movable part (11, 12, and 13) to be reduced and actuator power to be reduced as compared to a moving magnet system in which the first coil is fixed to the side of the casing, the magnets are fixed to the side of the lens unit, and the magnets are moved.

As shown in FIGS. 3 and 4, a second coil (a detection coil) 16 is provided on the inner circumferential surface of the casing 14 so as to circle around the inner circumferential surface. The second coil 16 is provided separated from the movable part (11, 12, and 13) so that the second coil 16 does not come into contact with the movable part (11, 12, and 13) even when the movable part (11, 12, and 13) moves in the movable region R1. The second coil 16 is provided above the magnets 15a, 15b, 15c, and 15d or, in other words, a side of incidence of light to the lens unit 11 (a side of a subject) in a direction along the optical axis AX.

The second coil 16 may be in contact with the magnets 15a, 15b, 15c, and 15d or may be separated from the magnets 15a, 15b, 15c, and 15d. The second coil 16 can be fixed by an adhesive or the like to the casing 14, the magnets 15a, 15b, 15c, and 15d, or the like. The number of turns, a coil diameter, a line diameter, a shape, and the like of the second coil 16 are not limited. In addition, while a case where the second coil 16 is wound in a toric shape in a plan view as shown in FIG. 4 has been exemplified, the second coil 16 is not limited to a toric shape and may be annularly wound in a rectangular shape or the like.

Figure 5:
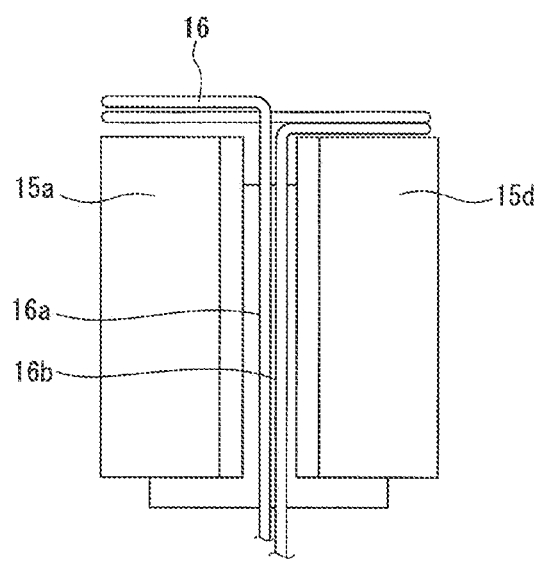
FIG. 5 is a side view showing the example of the camera module according to the embodiment of the present technique.

FIG. 5 is a side view in which the casing 14 has been omitted when viewed from a side surface that corresponds to a lower side of the top view of the camera module 3 shown in FIG. 3. As shown in FIG. 5, two lead wire portions 16a and 16b of the second coil 16 are routed downward via, for example, a position between the magnets 15a and 15d, and are connected to the control portion 5 shown in FIG. 1. It should be noted that the lead wire portions 16a and 16b of the second coil 16 may be routed downward via any of a position between the magnets 15a and 15b, a position between the magnets 15b and 15c, and a position between the magnets 15c and 15d.

Two lead wire portions (not illustrated) of the first coil 13 are also routed downward via, for example, any of positions between the magnets 15a, 15b, 15c, and 15d. The two lead wire portions 16a and 16b of the second coil 16 and the two lead wire portions (not illustrated) of the first coil 13 may be routed downward via a same position (for example, a position on a side of a driver IC) of any of the positions between the magnets 15a, 15b, 15c, and 15d. Alternatively the two lead wire portions 16a and 16b of the second coil 16 and the two lead wire portions (not illustrated) of the first coil 13 may be routed downward via different positions among the positions between the magnets 15a, 15b, 15c, and 15d.

The second coil 16 detects a position of the lens unit 11 by detecting an electromotive force due to mutual induction that occurs on the second coil 16 when a current is supplied to the first coil 13. In other words, when a current is supplied to the first coil 13 in order to adjust a position of the lens unit 11, an alternating current component of the current supplied to the first coil 13 causes induced electromotive force to be generated on the second coil 16.

The induced electromotive force that is generated on the second coil 16 is dependent on a distance between the first coil 13 and the second coil 16 and on a current value of the first coil 13. The shorter the distance between the first coil 13 and the second coil 16, the larger the induced electromotive force that is generated on the second coil 16. In addition, the larger the current value of the first coil 13, the larger the induced electromotive force that is generated on the second coil 16. Therefore, by detecting the induced electromotive force that is generated on the second coil 16 and performing signal processing, a position of the lens unit 11 with respect to a light-receiving surface of the imaging element 22 of the imaging module 2 can be detected.

As shown in FIG. 4, the imaging module 2 is arranged on the optical axis AX and captures an image by photoelectrically converting light having been transmitted through the lens unit 11. The imaging module 2 includes the substrate 21 and the imaging element 22 that is arranged on the substrate 21.

The substrate 21 is a wiring substrate for electrically connecting the imaging element 22 to the outside and, for example, a flexible substrate or the like can be used. The imaging element 22 can be constituted by a solid-state imaging element such as a charge-coupled device (CCD) type image sensor or a complementary metal-oxide semiconductor (CMOS) type image sensor. The imaging element 22 generates an image signal by photoelectrically converting light having been transmitted through the lens unit 11 and a cover glass 24. The imaging element 22 outputs the generated image signal to the image signal processing portion 4 shown in FIG. 1.

As shown in FIG. 4, the cover holder 23 is arranged around the imaging element 22. The lens module 1 and the imaging module 2 are integrated by bonding the cover holder 23 and the casing 14 of the lens module 1 to each other via an adhesive or the like. The cover glass 24 is attached to the cover holder 23 so as to be positioned above the imaging element 22. The cover glass 24 can be constituted by, for example, an infrared cutoff filter.

Next, an example of an operation of the movable part (11, 12, and 13) by a VCM as an actuator that is constituted by the magnets 15a, 15b, 15c, and 15d and the first coil 13 shown in FIGS. 3 and 4 will be described with reference to FIGS. 6 and 7.

Figure 6:
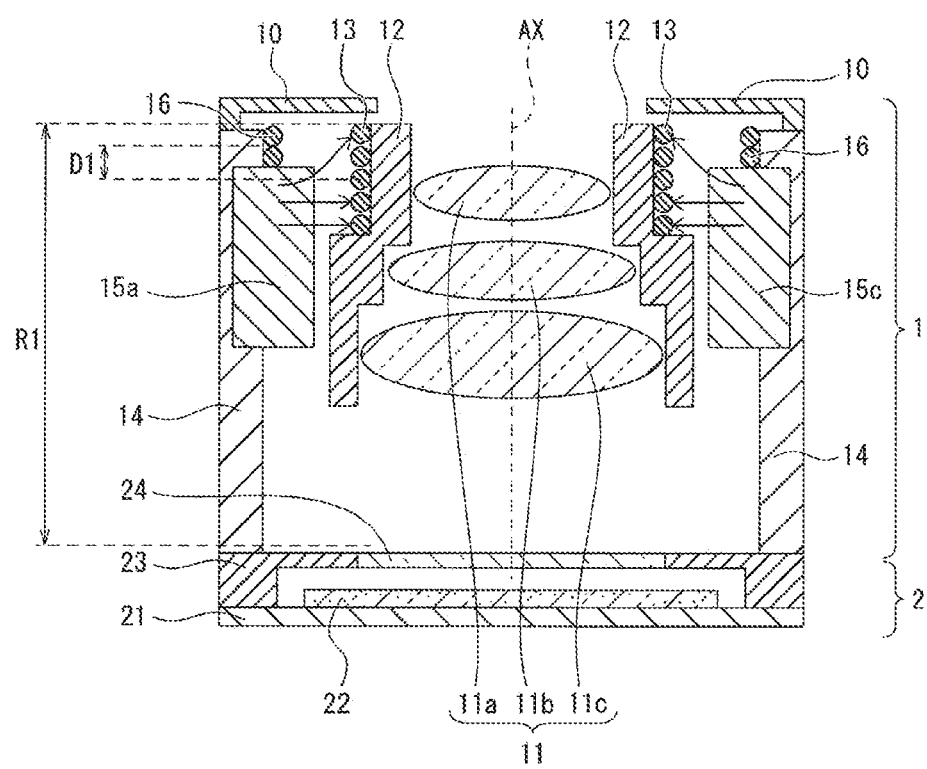
FIG. 6 is a sectional view during macro photography of the camera module according to the embodiment of the present technique.

For example, during macro photography, as shown in FIG. 6, the movable part (11, 12, and 13) is moved upward (a side of a subject) so as to be separated from the imaging element 22. FIG. 6 shows the first state where the movable part (11, 12, and 13) has moved to the upper end of the movable region R1. Since magnetic fluxes (schematically illustrated by arrows in FIG. 6) of the magnets 15a, 15b, 15c, and 15d spread to reverse polarities at ends thereof, the movable part (11, 12, and 13) is movable until an upper end of the first coil 13 is positioned above upper ends of the magnets 15a, 15b, 15c, and 15d. In other words, in the movable region R, at least a part of the first coil 13 of the movable part (11, 12, and 13) and at least a part of the second coil 16 overlap with and oppose each other in a direction that is perpendicular to the optical axis AX. As shown in FIG. 6, since the second coil 16 is arranged on a subject side, a distance D1 in a direction along the optical axis AX between the first coil 13 on the subject side and the second coil 16 is minimized and the first coil 13 and the second coil 16 approach each other.

Figure 7:
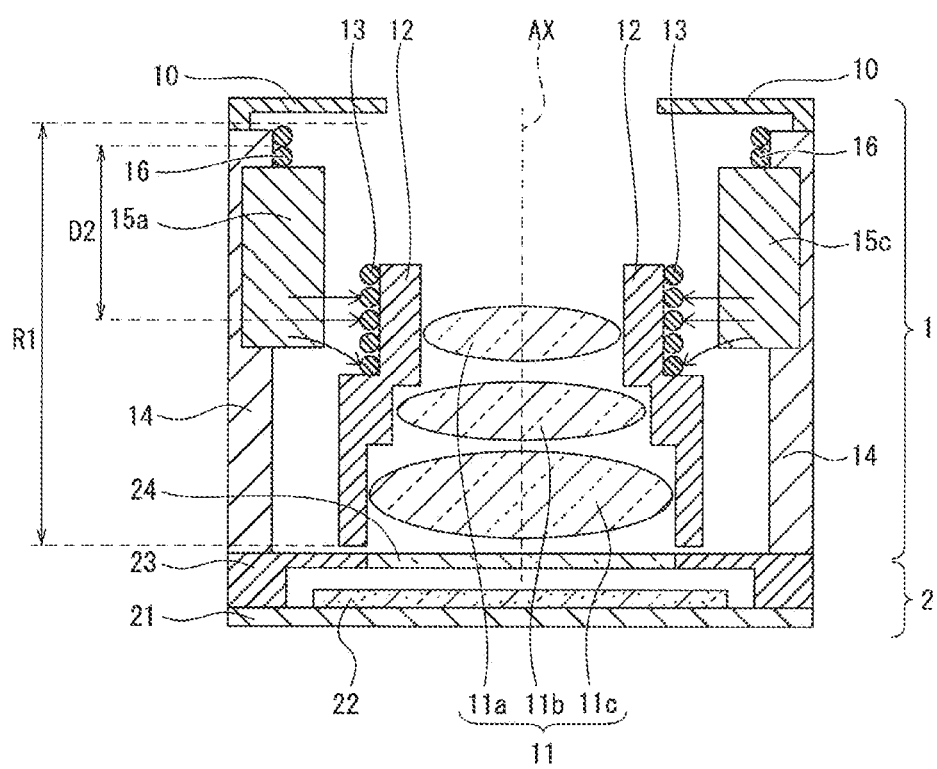
FIG. 7 is a sectional view during long distance photography of the camera module according to the embodiment of the present technique.

On the other hand, during long distance photography, as shown in FIG. 7, the movable part (11, 12, and 13) is moved downward (a side of the imaging element 22) so as to approach the imaging element 22. FIG. 7 shows the second state where the movable part (11, 12, and 13) has moved to a lower end of the movable region R1. Since magnetic fluxes (schematically illustrated by arrows in FIG. 7) of the magnets 15a, 15b, 15c, and 15d spread to reverse polarities at ends thereof, the movable part (11, 12, and 13) is movable until a lower end of the first coil 13 is positioned below lower ends of the magnets 15a, 15b, 15c, and 15d. As shown in FIG. 7, since the second coil 16 is arranged on the subject side, a distance D2 in the direction along the optical axis AX between the first coil 13 on the side of the imaging element 22 and the second coil 16 is maximized.

In other words, the distance D1 between the first coil 13 and the second coil 16 in the first state shown in FIG. 6 is smaller than the distance D2 between the first coil 13 and the second coil 16 in the second state shown in FIG. 7. Therefore, the induced electromotive force of the second coil 16 relatively increases during macro photography in the first state or the like and the induced electromotive force of the second coil 16 relatively decreases during long distance photography in the second state or the like. In this case, although a resolution required for position control of the lens unit 11 is higher during macro photography than during long distance photography, since the induced electromotive force of the second coil 16 is relatively larger during macro photography, the position of the lens unit 11 can be detected with high accuracy. As a result, the lens unit 11 can be positioned at a higher speed and with higher accuracy during macro photography than during long distance photography.

Next, configurations of the image signal processing portion 4 and the control portion 5 shown in FIG. 1 will be described. The image signal processing portion 4 receives an image signal that is output from the imaging element 22 of the imaging module 2. Based on the received image signal, the image signal processing portion 4 executes arithmetic processing for determining a target position of the lens unit 11 so that light having been transmitted through the lens unit 11 forms an image on the imaging element 22. The image signal processing portion 4 outputs data of a target position command value determined by the arithmetic processing to the control portion 5.

A microprocessor (MPU) that is mounted as a microchip, a digital signal processor (DSP) having an enhanced arithmetic operation function and specializing in signal processing, or the like can be used as the image signal processing portion 4. Alternatively, a part of the configuration or the entire configuration of the image signal processing portion 4 may be constituted by a programmable logic device (PLD) such as a field programmable gate array (FPGA).

The control portion 5 adopts a feedback system (a closed loop system) in which a position of the lens unit 11 is identified based on the induced electromotive force detected by the second coil 16 and the position of the lens unit 11 is controlled based on the identified position of the lens unit 11. The control portion 5 includes differential amplifiers (pre-amplifiers) 51a and 51b, an analog-digital conversion circuit (ADC) 52, a filter 53, a control circuit 54, a pulse generation circuit 55, and a drive circuit 56. It should be noted that a part of or the entire control portion 5 may be built into a semiconductor chip that is mounted with the imaging element 22. Alternatively, a part of or the entire control portion 5 may be constituted by a driver IC that is independent of the semiconductor chip that is mounted with the imaging element 22.

Input sides of the differential amplifiers 51a and 51b are respectively connected to the two terminals (lead wire portions) of the second coil 16. A potential difference (induced electromotive voltage) between the two terminals of the second coil 16 is input to the differential amplifiers 51a and 51b as a position detection signal that indicates the position of the lens unit 11 with respect to the imaging element 22. The differential amplifiers 51a and 51b differentially amplify the position detection signal from the second coil 16.

An input side of the ADC 52 is connected to output sides of the differential amplifiers 51a and 51b. The ADC 52 converts the position detection signal that is an analog signal having been differentially amplified by the differential amplifiers 51a and 51b into a digital signal. An input side of the filter 53 is connected to the output side of the ADC 52. The filter 53 subjects the position detection signal having been converted into a digital signal by the ADC 52 to filter processing and outputs the processed position detection signal. The filter 53 can be constituted by, for example, a low-pass filter that removes high-frequency components.

An input side of the control circuit 54 is connected to an output side of the image signal processing portion 4 and an output side of the filter 53. The control circuit 54 receives the target position command value having been output by the image signal processing portion 4 and the position detection signal having been subjected to filter processing by the filter 53. The control circuit 54 identifies a present position of the lens unit 11 from data of the position detection signal. In addition, based on data of the target position command value and the data of the position detection signal, the control circuit 54 generates a control signal for moving the lens unit 11 from the present position to a target position by arithmetic processing and outputs the generated control signal to the pulse generation circuit 55. The control circuit 54 can adopt feedback control such as proportional (P) control, proportional-integral (PI) control, or proportional-integral-derivative (PID) control.

An input side of the pulse generation circuit 55 is connected to the output side of the control circuit 54. The pulse generation circuit 55 receives the control signal from the control circuit 54 and generates a pulse signal (a PWM modulated signal) having a duty ratio in accordance with the received control signal.

An input side of the drive circuit 56 is connected to an output side of the pulse generation circuit 55. The drive circuit 56 can be constituted by, for example, an H bridge including four transistors. The drive circuit 56 receives the pulse signal from the pulse generation circuit 55 and supplies a current (a drive current) in accordance with the received pulse signal to the first coil 13. Accordingly, the VCM that is constituted by the magnets 15a, 15b, 15c, and 15d and the first coil 13 shown in FIGS. 3 and 4 functions, the position of the lens unit 11 is controlled so that the lens unit 11 moves to the target position, and a focal length is adjusted.

(Drive Method of Lens Unit)

Next, a drive method of the lens unit 11 according to the embodiment of the present technique will be described with reference to FIGS. 8A to 8C and using a case of PWM control as an example. Abscissas of FIGS. 8A to 8C indicate time and time axes correspond to each other.

Figure 8A:
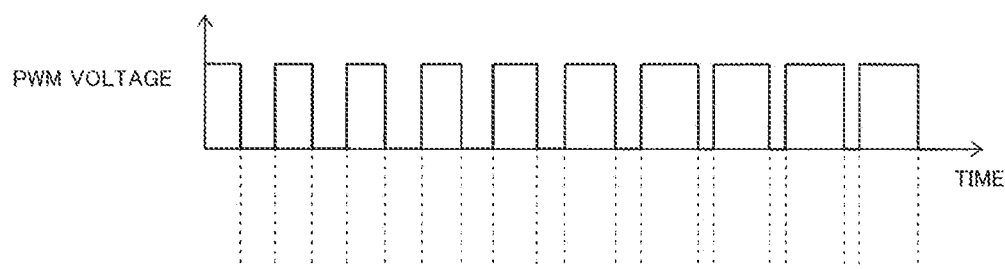
FIG. 8A is a graph showing a temporal variation of pulse-width modulation (PWM) voltage under PWM control according to the embodiment of the present technique.

The drive circuit 56 of the control portion 5 shown in FIG. 1 supplies a drive signal of PWM voltage such as that shown in FIG. 8A to the first coil 13. In the example shown in FIG. 8A, a duty ratio of PWM voltage is increased from a certain value after a predetermined time has passed.

Figure 8B:
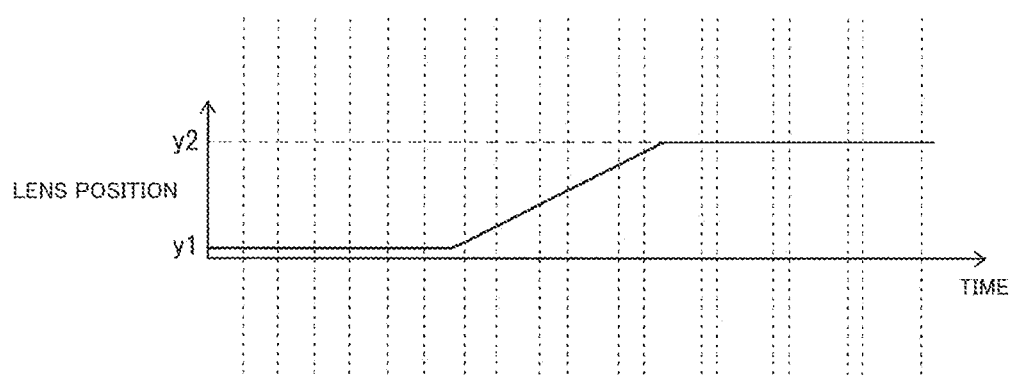
FIG. 8B is a graph showing a temporal variation of a lens position under PWM control according to the embodiment of the present technique.

Accordingly, the VCM that is constituted by the magnets 15a, 15b, 15c, and 15d and the first coil 13 shown in FIGS. 3 and 4 functions in accordance with PWM voltage that is supplied to the first coil 13 and displaces the position of the lens unit 11 as shown in FIG. 8B. For example, an initial position y1 of the lens unit 11 shown in FIG. 8B is on a side of the imaging element 22 (a side of long distance photography) and may be the second state of the movable part (11, 12, and 13) having moved to a lower end of the movable region R1 shown in FIG. 7. In addition, a position y2 after movement of the lens unit 11 shown in FIG. 8B is on a side of the subject (a side of macro photography) and may be the first state of the movable part (11, 12, and 13) having moved to an upper end of the movable region R1 shown in FIG. 6.

Figure 8C:
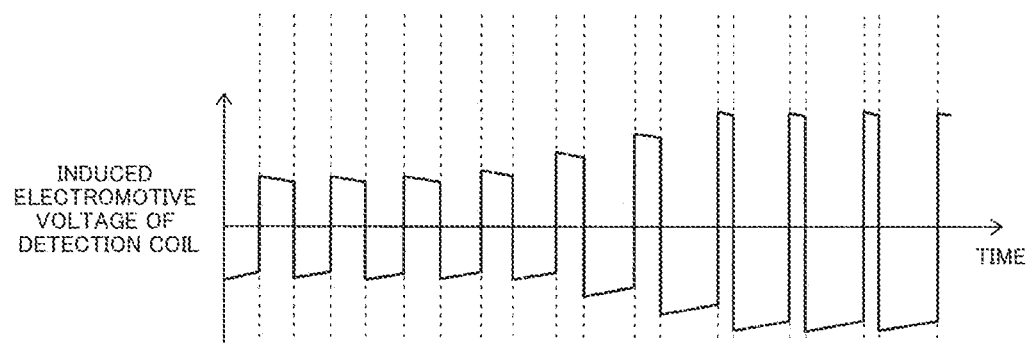
FIG. 8C is a graph showing a temporal variation of induced electromotive voltage under PWM control according to the embodiment of the present technique.

As shown in FIG. 8C, an induced electromotive force is generated on the second coil 16 by an alternating current component of a drive signal that is supplied to the first coil 13. In the case of PWM control, since a voltage waveform of the induced electromotive force generated on the second coil 16 is a rectangular wave as shown in FIG. 8C, by detecting an edge of the rectangular wave, the control circuit 54 can identify the position of the lens unit 11.

As shown in FIG. 7, when the lens unit 11 moves to the side of the imaging element 22, the first coil 13 and the second coil 16 become relatively distant from each other. Therefore, as shown on a left side of FIG. 8C, an amplitude of the induced electromotive voltage that is generated on the second coil 16 is relatively small. On the other hand, as shown in FIG. 6, when the lens unit 11 moves to the side of the subject, the first coil 13 and the second coil 16 approach each other. Therefore, as shown on a right side of FIG. 8C, an amplitude of the induced electromotive voltage that is generated on the second coil 16 is relatively large and the position of the lens unit 11 can be detected with relatively high accuracy.

In the lens module 1 according to the embodiment of the present technique, the second coil 16 is arranged inside the casing 14 as a position sensor for detecting the position of the lens unit 11. In addition, by detecting the induced electromotive force that is generated on the second coil 16 due to a magnetic flux that is generated from the first coil 13, reading a voltage value or a current value of the detected induced electromotive force with the control portion 5, and performing signal processing, the position of the lens unit 11 can be identified.

Therefore, compared to a case where a Hall element is used as a position sensor, since a magnet strong enough to operate a Hall element is no longer required and magnetic shielding can be provided, leakage of a magnetic flux to the outside of the lens module 1 can be prevented. As a result, constraints of a position inside a set for assembling the lens module 1 can be alleviated and a degree of freedom of arrangement in the set can be improved.

In addition, in the lens module 1 according to the embodiment of the present technique, since the second coil 16 is arranged inside the casing 14 as a position sensor for detecting the position of the lens unit 11, an inexpensive and simple configuration can be adopted as compared to cases where a Hall element or an MR element is used as the position sensor. Moreover, even during mass production, individual adjustments of a position as in the case of a Hall element or an MR element is no longer necessary and mass production cost can be reduced.

Furthermore, in the lens module 1 according to the embodiment of the present technique, the second coil 16 is arranged inside the casing 14 together with the first coil 13 and the magnets 15a, 15b, 15c, and 15d that constitute a VCM.

Accordingly, compared to cases where the second coil 16 is provided outside of the casing 14 such as on an outer circumferential surface of the casing 14 or below the casing 14, the second coil 16 can be brought close to the first coil 13 and the position of the lens unit 11 can be detected with high accuracy.

In addition, in the lens module according to the embodiment of the present technique, the second coil 16 is provided on a side of incidence of light to the lens unit 11 or, in other words, a side of a subject with respect to the magnets 15a, 15b, 15c, and 15d in a direction along the optical axis AX. Accordingly, since the lens unit 11 and the second coil 16 approach each other during macro photography, an induced electromotive force that is larger than that during long distance photography is generated. Therefore, during macro photography in which relatively high position accuracy (position control resolution) of the lens unit 11 is required, the position of the lens unit 11 can be detected with relatively high accuracy as compared to during long distance photography.

(First Modification)

Figure 9:
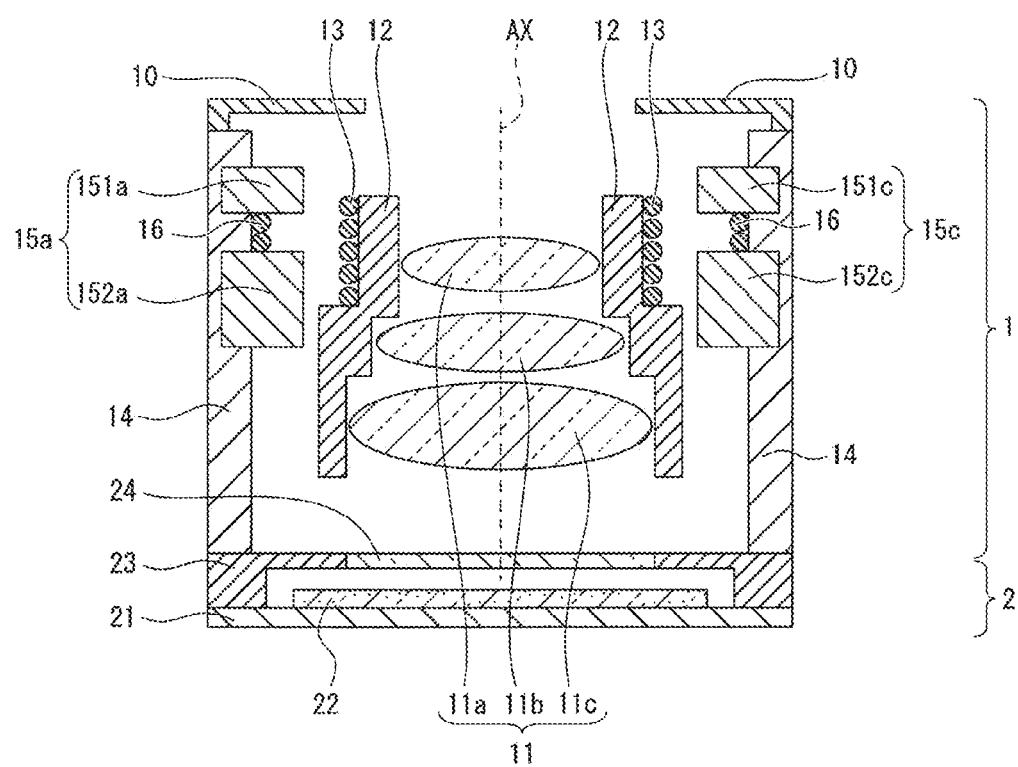
FIG. 9 is a sectional view showing an example of a camera module according to a first modification of the embodiment of the present technique.

As shown in FIG. 9, the lens module 1 according to a first modification of the embodiment of the present technique shares the configuration of the embodiment shown in FIG. 4 and the like in that a VCM is constituted by the magnets 15a and 15c and the first coil 13 and that the second coil 16 is arranged inside the casing 14.

However, the magnet 15a is divided in an up-down direction along the optical axis AX of the lens unit 11 into a first divided magnet (an upper divided magnet) 151a and a second divided magnet (a lower divided magnet) 152a that is arranged below the first divided magnet 151a so as to be separated from the first divided magnet 151a. The magnet 15c is divided along the optical axis AX into a first divided magnet (an upper divided magnet) 151c and a second divided magnet (a lower divided magnet) 152c that is arranged below the first divided magnet 151c so as to be separated from the first divided magnet 151c. In other words, the lens module 1 according to the first modification differs from the configuration of the embodiment shown in FIG. 4 and the like in that the second coil 16 is inserted between the first divided magnet 151a and the second divided magnet 152a and between the first divided magnet 151c and the second divided magnet 152c.

Although not shown in FIG. 9, the magnets 15a and 15c are arranged adjacent to the magnets 15a and 15c as shown in FIG. 3. In addition, the magnets 15b and 15d are also divided in plurality in a direction along the optical axis AX in a similar manner to the magnets 15a and 15c.

Although sizes of the first divided magnets 151a and 151c are larger than sizes of the second divided magnets 152a and 152c in a direction along the optical axis AX in FIG. 9, this is not restrictive. For example, the sizes of the first divided magnets 151a and 151c may be the same as the sizes of the second divided magnets 152a and 152c or the sizes of the first divided magnets 151a and 151c may be smaller than the sizes of the second divided magnets 152a and 152c. In other words, the position of the second coil 16 can be adjusted by adjusting sizes and intervals in which the first divided magnets 151a and 151c and the second divided magnets 152a and 152c are divided.

According to the first modification, the second coil 16 can be arranged near the middle of a movable region along the optical axis AX of the movable part (11, 12, and 13). Accordingly, since a range in which the first coil 13 and the second coil 16 overlap with each other in a direction along the optical axis AX widens and an average value of the induced electromotive force that is generated on the second coil 16 increases. As a result, the position of the lens unit 11 can be detected with good accuracy over the entire movable region along the optical axis AX of the movable part (11, 12, and 13).

(Second Modification)

Figure 10:
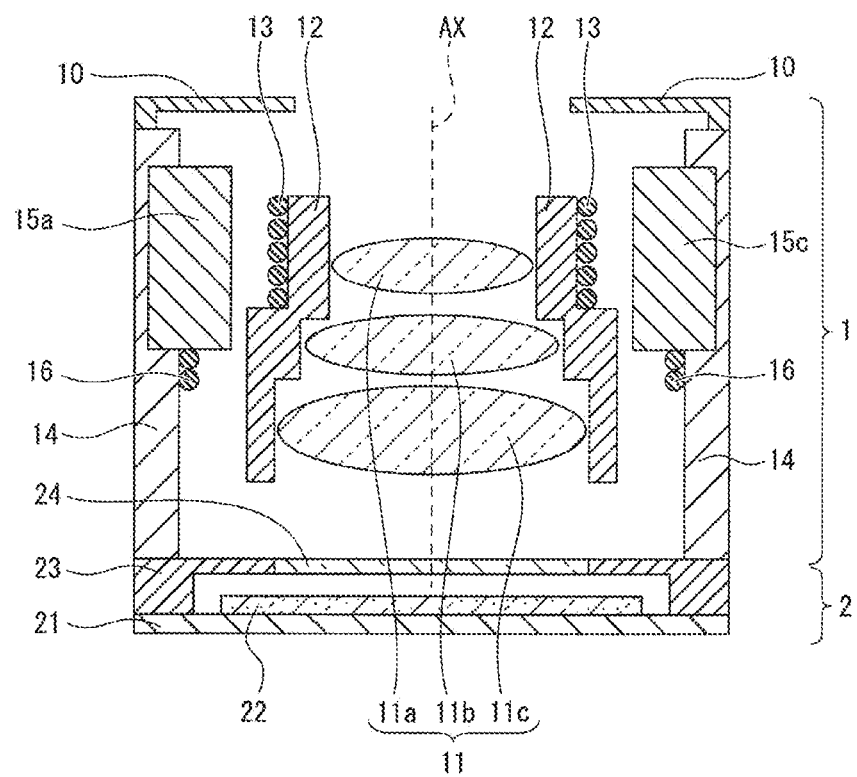
FIG. 10 is a sectional view showing an example of a camera module according to a second modification of the embodiment of the present technique.

As shown in FIG. 10, the lens module 1 according to a second modification of the embodiment of the present technique shares the configuration of the embodiment shown in FIG. 4 and the like in that a VCM is constituted by the magnets 15a and 15c and the first coil 13 and that the second coil 16 is arranged inside the casing 14. However, there is a difference from the configuration of the embodiment shown in FIG. 4 and the like in that the second coil 16 is arranged below the magnets 15a and 15c or, in other words, arranged on a side of the imaging element 22 with respect to the magnets 15a and 15c in a direction along the optical axis AX.

According to the second modification, when the movable part (11, 12, and 13) moves downward (a side of the imaging element 22), since the first coil 13 and the second coil 16 approach each other, a relatively large induced electromotive force is generated during long distance photography. As a result, the position of the lens unit 11 can be detected with higher accuracy during long distance photography than during macro photography. In addition, since the second coil 16 is present below (a side of the imaging element 22), routing of the two terminals (lead wire portions) of the second coil 16 can be readily performed.

(Third Modification)

Figure 11:
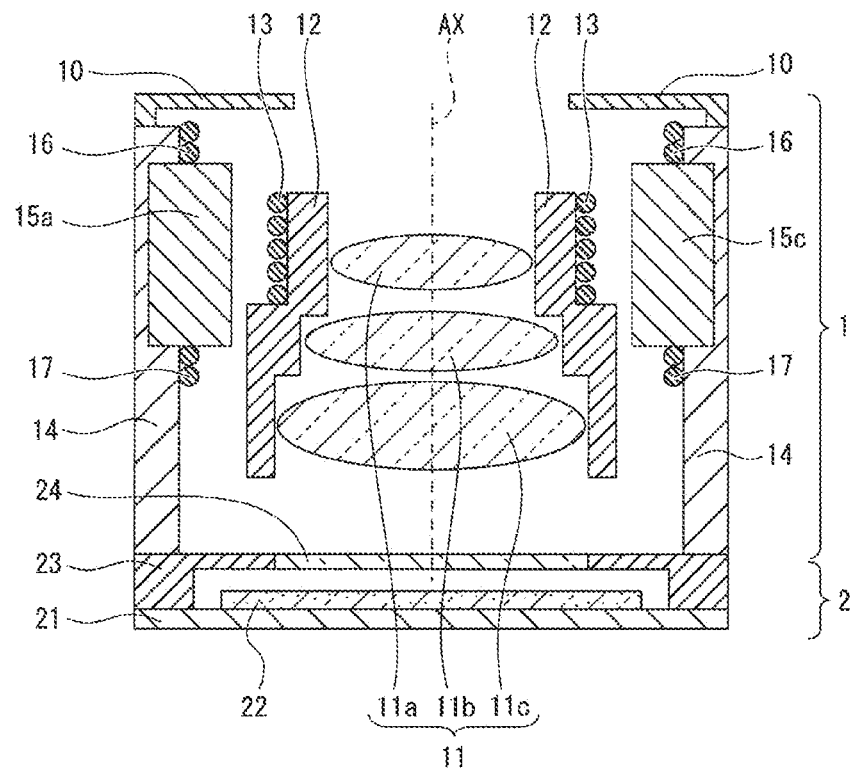
FIG. 11 is a sectional view showing an example of a camera module according to a third modification of the embodiment of the present technique.

As shown in FIG. 11, the lens module 1 according to a third modification of the embodiment of the present technique shares the configuration of the embodiment shown in FIG. 4 and the like in that a VCM is constituted by the magnets 15a and 15c and the first coil 13. However, there is a difference from the configuration of the embodiment shown in FIG. 4 and the like in that a plurality of (two) second coils 16 and 17 are arranged inside the casing 14.

The second coils 16 and 17 are provided separated from each other in a direction along the optical axis AX. The second coil 16 is arranged above the magnets 15a and 15c or, in other words, arranged on a side of the subject with respect to the magnets 15a and 15c in a direction along the optical axis AX. The second coil 17 is arranged below the magnets 15a and 15c or, in other words, arranged on a side of the imaging element 22 with respect to the magnets 15a and 15c in a direction along the optical axis AX. An alternating current component of a current supplied to the first coil 13 causes induced electromotive force to be respectively generated on the second coils 16 and 17. The position of the lens unit 11 can be identified based on the induced electromotive force of each of the second coils 16 and 17.

According to the third modification, by arranging a plurality of (two) second coils 16 and 17, the first coil 13 and the second coil 16 approach each other during macro photography and the first coil 13 and the second coil 17 approach each other during long distance photography. As a result, the position of the lens unit 11 can be detected with higher accuracy during both long distance photography and macro photography. This is effective when, for example, a movable region along the optical axis AX of the movable part (11, 12, and 13) is expansive such as when a zoom function is provided.

(Fourth Modification)

Figure 12:
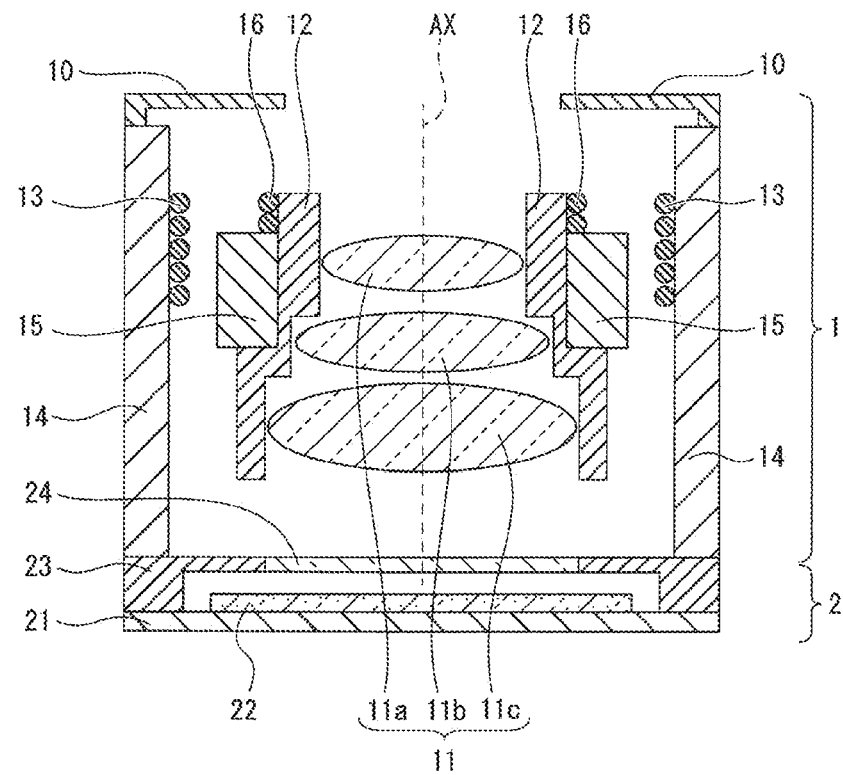
FIG. 12 is a sectional view showing an example of a camera module according to a fourth modification of the embodiment of the present technique.

As shown in FIG. 12, the lens module 1 according to a fourth modification of the embodiment of the present technique shares the configuration of the embodiment shown in FIG. 4 and the like in that a VCM is constituted by the magnets 15a and 15c and the first coil 13 and that the second coil 16 is arranged. However, there is a difference from the configuration of the embodiment shown in FIG. 4 and the like in that a moving magnet system is adopted instead of a moving coil system. Specifically, the first coil 13 is fixed to the side of the casing 14, the magnet 15 is fixed to the side of the lens unit 11, and the magnet 15 is moved together with the lens unit 11.

The second coil 16 is arranged separated from the first coil 13 outside of the lens tube 12. FIG. 12 exemplifies a case where the second coil 16 is arranged above the magnet 15 or, in other words, arranged on a side of the subject with respect to the magnet 15 in a direction along the optical axis AX. Alternatively, the second coil 16 may be arranged below the magnet 15 or, in other words, arranged on a side of the imaging element 22 with respect to the magnet 15 in a direction along the optical axis AX.

According to the fourth modification, even when the moving magnet system is adopted, the position of the lens unit 11 can be detected by arranging the second coil 16 outside of the lens tube 12. In other words, the present technique can be applied with respect to a configuration in which a VCM is constructed by arranging the second coil 16 and the magnets 15a and 15c at opposing positions and providing the second coil 16 on a same side as the magnets 15a and 15c (an opposite side to the first coil 13).

(Fifth Modification)

Figure 13:
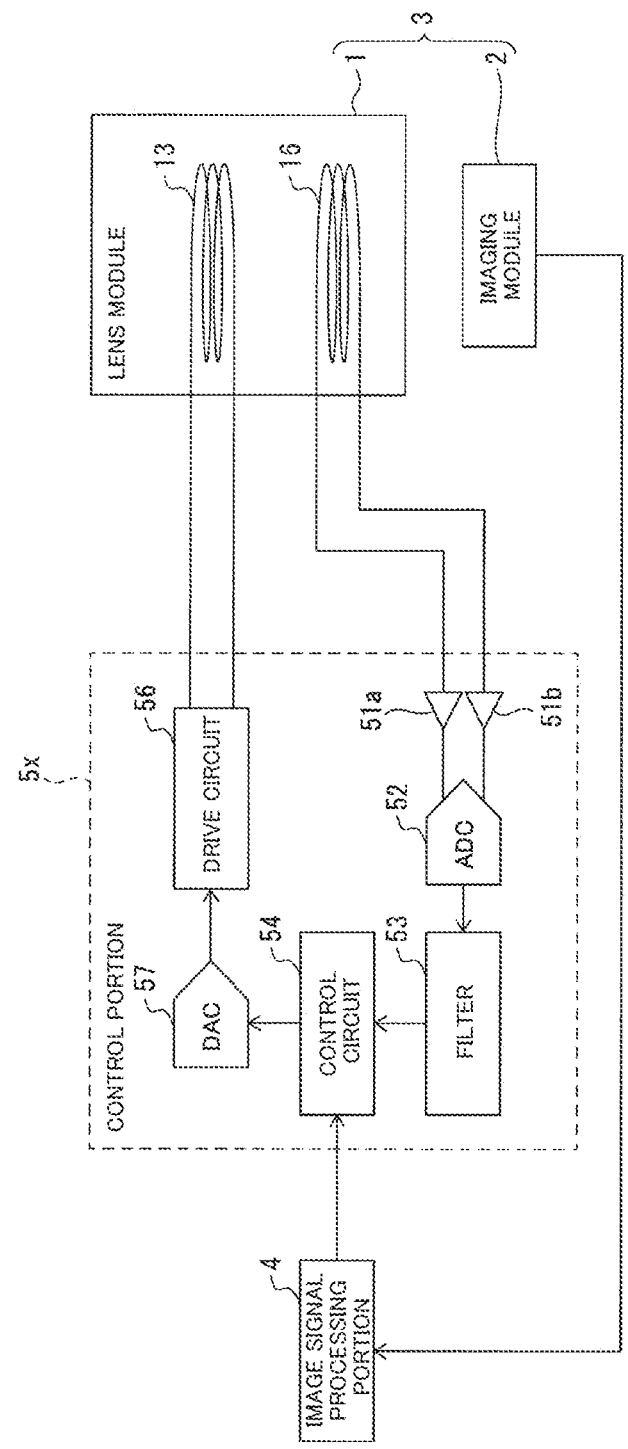
FIG. 13 is a block diagram showing an example of an electronic device according to a fifth embodiment of the present technique.

As shown in FIG. 13, in an electronic device according to a fifth modification of the embodiment of the present technique, configurations of the camera module 3 and the image signal processing portion 4 are common to the configurations of the embodiment shown in FIG. 1 and the like. However, there is a difference from the configurations of the embodiment shown in FIG. 1 and the like in that a control portion 5x performs linear control instead of PWM control.

In the control portion 5x, a digital-analog conversion circuit (DAC) 57 is connected to an output side of the control circuit 54. The DAC 57 converts a digital signal that is a control signal from the control circuit 54 into an analog signal and outputs the converted analog signal to the drive circuit 56. The drive circuit 56 can be constituted by, for example, a BTL (Bridge Transformer Less) or an H bridge. The drive circuit 56 supplies the first coil 13 with a direct current (DC) current in accordance with the analog signal from the DAC 57 as a drive circuit. In the case of linear control, the position of the lens unit 11 can be detected by having, for example, the second coil 16 detect a change in the drive current being supplied to the first coil 13 when the position of the lens unit 11 moves.

According to the fifth modification, even when the control portion 5x performs linear control, the position of the lens unit 11 can be detected by the second coil 16.

<1. Example of Application to Electronic Device>

Figure 14:
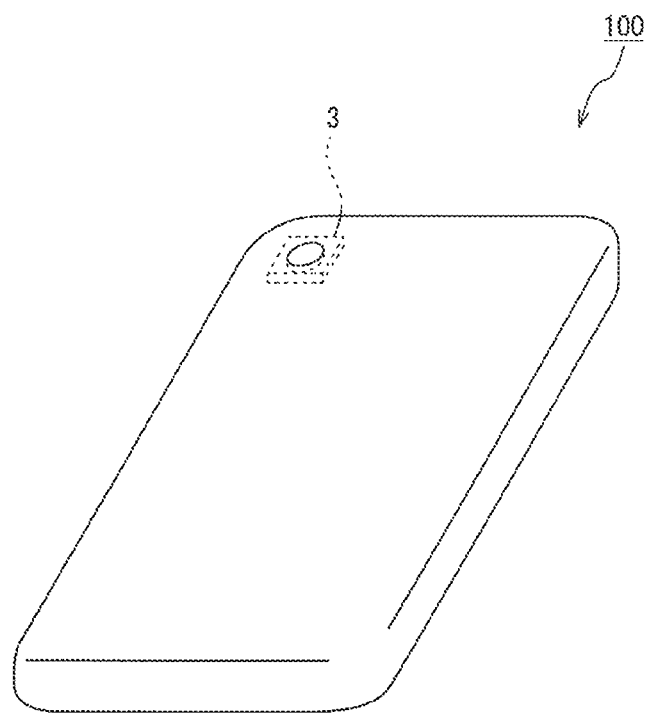
FIG. 14 is a diagram showing an example of a schematic configuration of an electronic device.

The technique according to the present disclosure (the present technique) can be applied to various products. For example, the present technique can be applied to an electronic device having an imaging function. FIG. 14 shows a smartphone 100 as an example of an electronic device to which the present technique may be applied. The smartphone 100 is mounted with the camera module 3 shown in FIG. 2 and the like.

The present technique is also applicable to electronic devices having an imaging function such as mobile phones other than smartphones, imaging apparatuses such as digital cameras and video cameras, tablet terminals, and personal computers.

<2. Example of Application to Endoscopic Surgery System>

The technique according to the present disclosure (the present technique) can be applied to various products. For example, the technique according to the present disclosure can be applied to an endoscopic surgery system.

Figure 15:
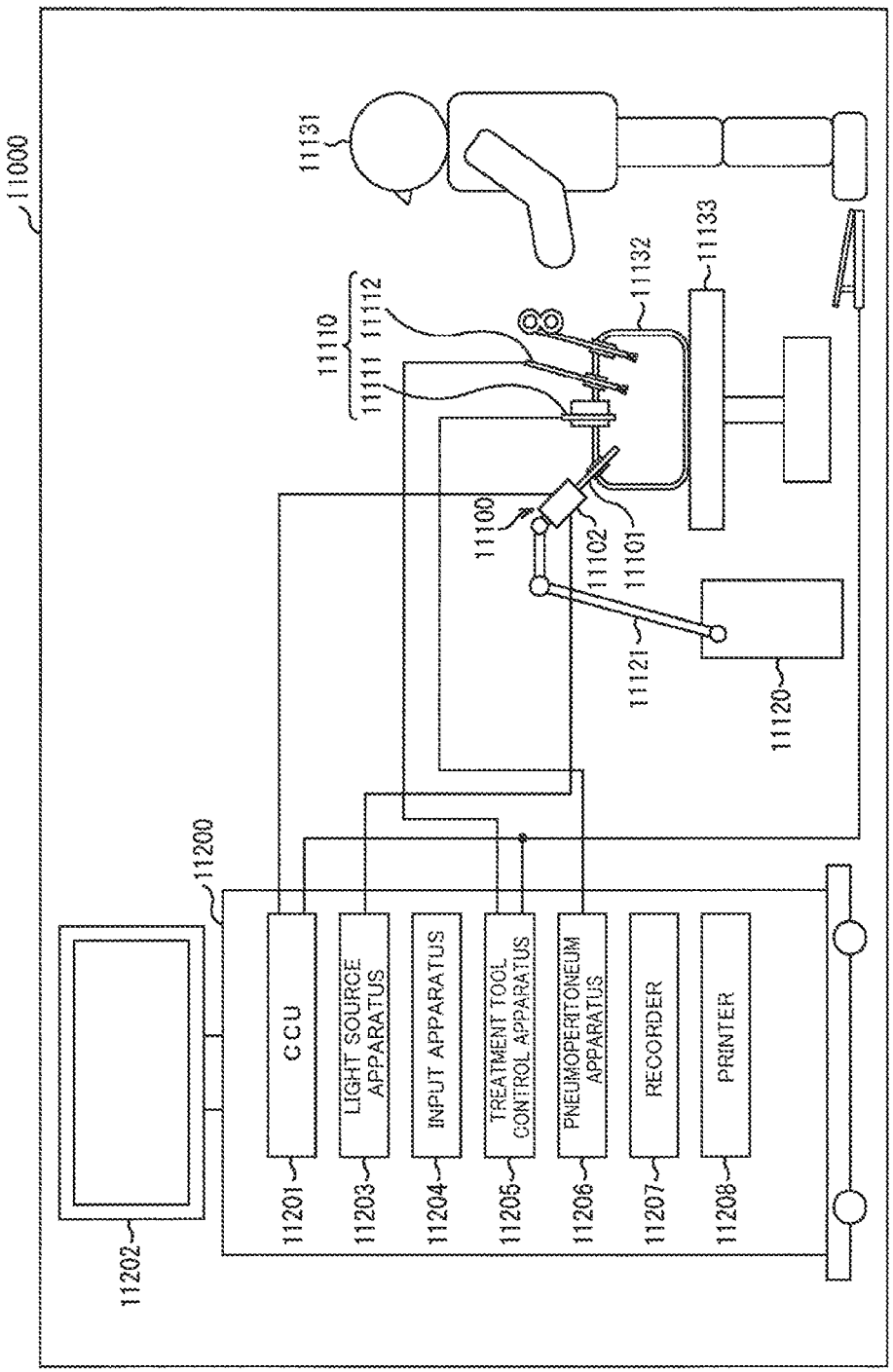
FIG. 15 is a diagram showing an example of a schematic configuration of an endoscopic surgery system.

FIG. 15 is a diagram showing an example of a schematic configuration of an endoscopic surgery system to which the technique according to the present disclosure (the present technique) may be applied.

FIG. 15 shows a situation where an operator (a physician) 11131 is performing an operation on a patient 11132 on a patient bed 11133 using an endoscopic surgery system 11000. As illustrated, the endoscopic surgery system 11000 is constituted by an endoscope 11100, other surgical tools 11110 such as a pneumoperitoneum tube 11111 and an energized treatment tool 11112, a support arm apparatus 11120 for supporting the endoscope 11100, and a cart 11200 mounted with various apparatuses for an endoscopic surgery.

The endoscope 11100 is constituted by a lens tube 11101 of which a region of a predetermined length from a tip is to be inserted into a body cavity of the patient 11132 and a camera head 11102 that is connected to a base end of the lens tube 11101. While the illustrated example represents the endoscope 11100 that is configured as a so-called rigid scope having a rigid lens tube 11101, alternatively, the endoscope 11100 may be configured as a so-called flexible scope having a flexible lens tube.

An opening fitted with an objective lens is provided at the tip of the lens tube 11101. A light source apparatus 11203 is connected to the endoscope 11100, and light generated by the light source apparatus 11203 is guided to the tip of the lens tube 11101 by a light guide that is provided so as to extend inside the lens tube 11101 and irradiated via the objective lens toward an observation target inside the body cavity of the patient 11132. It should be noted that the endoscope 11100 may be a forward-viewing endoscope, an angled endoscope, or a lateral-viewing endoscope.

An optical system and an imaging element are provided inside the camera head 11102, and reflected light (observation light) from the observation target is collected at the imaging element by the optical system. The observation light is photoelectrically converted by the imaging element and an electric signal corresponding to the observation light or, in other words, an image signal corresponding to an observation image is generated. The image signal is transmitted to a CCU (Camera Control Unit) 11201 as RAW data.

The CCU 11201 is constituted by a CPU (Central Processing Unit), a GPU (Graphics Processing Unit), and the like and comprehensively controls operations of the endoscope 11100 and a display apparatus 11202. Furthermore, the CCU 11201 receives the image signal from the camera head 11102 and subjects the image signal to various kinds of image processing for displaying an image based on the image signal such as development processing (demosaicking).

Under the control of the CCU 11201, the display apparatus 11202 displays an image based on the image signal having been subject to image processing by the CCU 11201.

The light source apparatus 11203 is constituted by a light source such as an LED (Light Emitting Diode) and supplies the endoscope 11100 with irradiation light when photographing an operative site or the like.

An input apparatus 11204 is an input interface with respect to the endoscopic surgery system 11000. A user can input various kinds of information and various instructions to the endoscopic surgery system 11000 via the input apparatus 11204. For example, the user inputs an instruction or the like to change imaging conditions (a type of irradiation light, a magnification, a focal length, and the like) of the endoscope 11100.

A treatment tool control apparatus 11205 controls drive of the energized treatment tool 11112 for cauterizing or incising tissue, sealing a blood vessel, or the like. A pneumoperitoneum apparatus 11206 feeds gas into the body cavity of the patient 11132 through the pneumoperitoneum tube 11111 in order to expand the body cavity for the purpose of securing a field of view of the endoscope 11100 and securing a work space for the operator. A recorder 11207 is an apparatus that is capable of recording various kinds of information related to the operation. A printer 11208 is an apparatus that is capable of printing various kinds of information related to the operation in various formats such as texts, images, and graphs.

The light source apparatus 11203 that supplies irradiation light to the endoscope 11100 when photographing an operative site can be constituted by a white light source that is an LED, a laser light source, or a combination thereof. When a white light source is constituted by a combination of RGB laser light sources, since output intensity and an output timing of each color (each wavelength) can be controlled with high accuracy, white balance of a captured image can be adjusted by the light source apparatus 11203. In addition, in this case, by irradiating the observation target with laser light from each of the RGB laser light sources by time division and controlling drive of the imaging element of the camera head 11102 in synchronization with the irradiation timings, an image corresponding to each of RGB can be captured by time division. According to the method, a color image can be obtained without providing the imaging element with a color filter.

In addition, drive of the light source apparatus 11203 may be controlled so that intensity of output light changes at a predetermined time interval. By controlling drive of the imaging element of the camera head 11102 in synchronization with a timing of change of the light intensity to acquire images by time division and compositing the images, an image with a high dynamic range with no so-called blocked-up shadows or blown-out highlights.

Furthermore, the light source apparatus 11203 may be configured to be capable of supplying light of a predetermined wavelength band that corresponds to special light observation. In special light observation, for example, by utilizing wavelength dependency of absorption of light of body tissue to irradiate light with a narrower band than irradiation light (in other words, white light) during a normal observation, so-called narrow band light observation (Narrow Band Imaging) is performed in which predetermined tissue such as a capillary in a mucous membrane surface layer is photographed at high contrast. Alternatively, in special light observation, fluorescent observation in which an image is obtained by fluorescence generated by irradiating excitation light may be performed. In fluorescent observation, body tissue can be irradiated with excitation light and fluorescence from the body tissue can be observed (self-fluorescent observation) or an agent such as indocyanine green (ICG) can be locally injected into body tissue and the body tissue may be irradiated with excitation light corresponding to a fluorescent wavelength of the agent to obtain a fluorescent image. The light source apparatus 11203 may be configured to be capable of supplying narrow band light and/or excitation light that corresponds to such special light observation.

Figure 16:
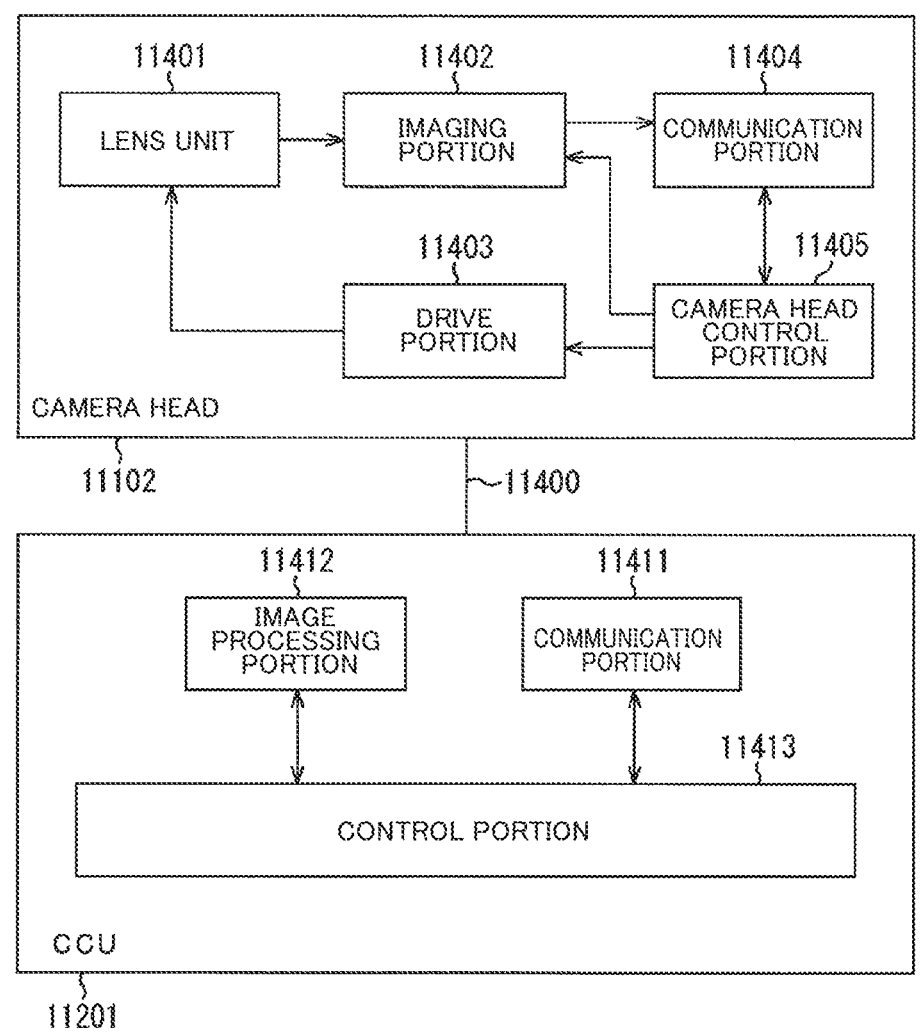
FIG. 16 is a block diagram showing an example of functional configurations of a camera head and a CCU.

FIG. 16 is a block diagram showing an example of functional configurations of the camera head 11102 and the CCU 11201 shown in FIG. 15.

The camera head 11102 has a lens unit 11401, an imaging portion 11402, a drive portion 11403, a communication portion 11404, and a camera head control portion 11405. The CCU 11201 has a communication portion 11411, an image processing portion 11412, and a control portion 11413. The camera head 11102 and the CCU 11201 are connected by a transmission cable 11400 so as to be capable of communicating with each other.

The lens unit 11401 is an optical system that is provided in a connecting portion with the lens tube 11101. Observation light taken in from a tip of the lens tube 11101 is guided to the camera head 11102 and input to the lens unit 11401. The lens unit 11401 is configured by combining a plurality of lenses including a zoom lens and a focus lens.

The imaging portion 11402 is constituted by an imaging element. The imaging portion 11402 may be constituted by a single imaging element (a so-called single-plate imaging element) or a plurality of image elements (a so-called multi-plate imaging element). When the imaging portion 11402 is constituted by a multi-plate imaging element, for example, an image signal corresponding to each of RGB may be generated by each imaging element and the image signals may be composited to produce a color image. Alternatively, the imaging portion 11402 may be configured to have a pair of imaging elements for respectively acquiring right-eye and left-eye image signals that correspond to 3D (Dimensional) display. Performing 3D display enables an operator 11131 to more accurately assess a depth of body tissue in the operative site. When the imaging portion 11402 is constituted by a multi-plate imaging element, the lens unit 11401 is also provided in a plurality of systems in correspondence with the respective imaging elements.

In addition, the imaging portion 11402 need not necessarily be provided in the camera head 11102. For example, the imaging portion 11402 may be provided immediately behind an objective lens inside the lens tube 11101.

The drive portion 11403 is constituted by an actuator and, under control from the camera head control portion 11405, moves the zoom lens and the focus lens of the lens unit 11401 by a predetermined distance along an optical axis. Accordingly, a magnification and a focal point of a captured image by the imaging portion 11402 can be appropriately adjusted.

The communication portion 11404 is constituted by a communication apparatus for transmitting and receiving various kinds of information to and from the CCU 11201. The communication portion 11404 transmits an image signal obtained from the imaging portion 11402 to the CCU 11201 via the transmission cable 11400 as RAW data.

In addition, the communication portion 11404 receives a control signal for controlling drive of the camera head 11102 from the CCU 11201 and supplies the camera head control portion 11405 with the control signal. The control signal includes information related to imaging conditions such as information that designates a frame rate of a captured image, information that designates an exposure value during imaging, and/or information that designates a magnification and a focal point of the captured image.

It should be noted that the imaging conditions such as a frame rate, an exposure value, a magnification, and a focal point described above may be appropriately designated by the user or automatically set by the control portion 11413 of the CCU 11201 based on an acquired image signal. In the case of the latter, the endoscope 11100 is to be mounted with a so-called AE (Auto Exposure) function, AF (Auto Focus) function, and AWB (Auto White Balance) function.

Based on the control signal from the CCU 11201 received via the communication portion 11404, the camera head control portion 11405 controls drive of the camera head 11102.

The communication portion 11411 is constituted by a communication apparatus for transmitting and receiving various kinds of information to and from the camera head 11102. The communication portion 11411 receives an image signal transmitted via the transmission cable 11400 from the camera head 11102.

In addition, the communication portion 11411 transmits, to the camera head 11102, a control signal for controlling drive of the camera head 11102. The image signal and the control signal can be transmitted by electric communication or optical communication.

The image processing portion 11412 performs various types of image processing on an image signal transmitted from the camera head 11102 that is RAW data.

The control portion 11413 performs various types of control related to imaging of an operative site or the like by the endoscope 11100 and display of a captured image that is obtained by the imaging of an operative site or the like. For example, the control portion 11413 generates a control signal for controlling drive of the camera head 11102.

In addition, based on an image signal having been subjected to image processing by the image processing portion 11412, the control portion 11413 causes the display apparatus 11202 to display a captured image showing an operative site or the like. In doing so, the control portion 11413 may recognize various objects inside the captured image using various image recognition techniques. For example, by detecting a shape, a color, and the like of an edge of an object included in the captured image, the control portion 11413 can recognize surgical tools such as forceps, a specific biological site, a hemorrhage, and mist or the like when using the energized treatment tool 11112. When causing the display apparatus 11202 to display the captured image, using the recognition result thereof, the control portion 11413 may cause various kinds of operation support information to be displayed so as to be superimposed on an image of the operative site. Superimposing and displaying the operation support information and presenting the same to the operator 11131 enables a load on the operator 11131 to be reduced and enables the operator 11131 to carry out the operation in a reliable manner.

The transmission cable 11400 that connects the camera head 11102 and the CCU 11201 is an electric signal cable that accommodates communication of electric signals, an optical fiber that accommodates optical communication, or a composite cable thereof.

While communication is performed in a wired manner using the transmission cable 11400 in the illustrated example, alternatively, the communication between the camera head 11102 and the CCU 11201 may be performed in a wireless manner.

This concludes the description of an example of an endoscopic surgery system to which the technique according to the present disclosure may be applied. The technique according to the present disclosure may be applied to the lens unit 11401 and the imaging portion 11402 of the camera head 11102 among the configuration described above. By applying the technique according to the present disclosure to the lens unit 11401 and the imaging portion 11402 of the camera head 11102, since a focal length can be adjusted at a higher speed and a clearer operative site image can be obtained, an operator can more quickly and reliably confirm an operative site.

While an endoscopic surgery system has been described as an example, the technique according to the present disclosure may be applied to other systems such as microscopic surgery systems.

<3. Example of Application to Mobile Body>

The technique according to the present disclosure (the present technique) can be applied to various products. For example, the technique according to the present disclosure may be realized as an apparatus to be mounted to any of various types of mobile bodies including an automobile, an electric vehicle, a hybrid electric vehicle, a motorcycle, a bicycle, personal mobility, an airplane, a drone, an ocean vessel, and a robot.

Figure 17:
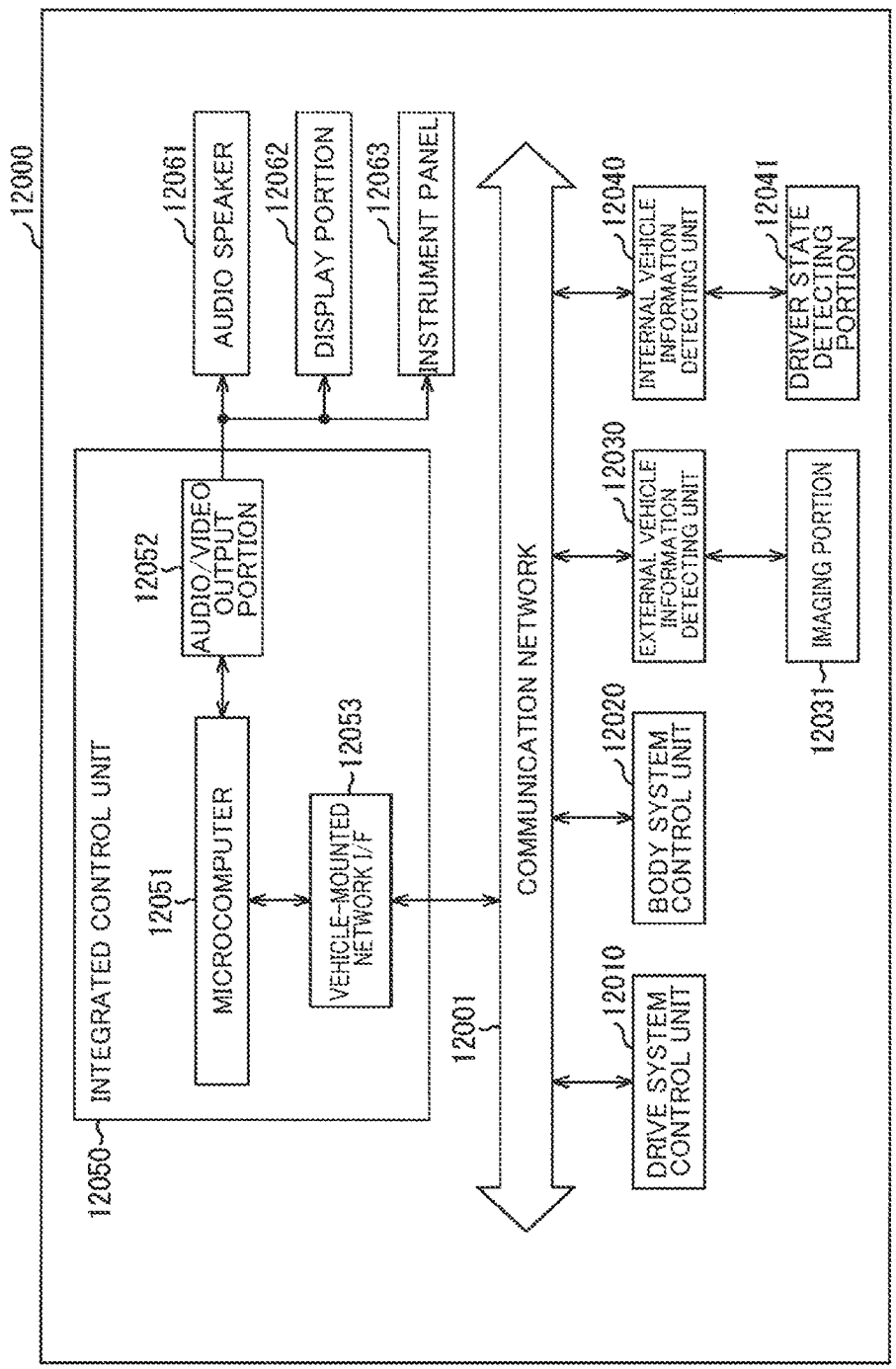
FIG. 17 is a block diagram showing an example of a schematic configuration of a vehicle control system.

FIG. 17 is a block diagram showing a schematic configuration example of a vehicle control system that is an example of a mobile body control system to which the technique according to the present disclosure may be applied.

A vehicle control system 12000 includes a plurality of electronic control units that are connected via a communication network 12001. In the example shown in FIG. 17, the vehicle control system 12000 includes a drive system control unit 12010, a body system control unit 12020, an external vehicle information detecting unit 12030, an internal vehicle information detecting unit 12040, and an integrated control unit 12050. In addition, as functional components of the integrated control unit 12050, a microcomputer 12051, an audio/video output portion 12052, and a vehicle-mounted network I/F (interface) 12053 are illustrated.

The drive system control unit 12010 controls operations of apparatuses related to a drive system of a vehicle in accordance with various programs. For example, the drive system control unit 12010 functions as a control apparatus of a drive force generation apparatus for generating a drive force of the vehicle such as an internal engine or a drive motor, a drive force transmission mechanism for transmitting the drive force to wheels, a steering mechanism for adjusting a steering angle of the vehicle, and a braking apparatus that generates a brake force of the vehicle.

The body system control unit 12020 controls operations of various apparatuses mounted to a vehicle body in accordance with various programs. For example, the body system control unit 12020 functions as a control apparatus of a key-less entry system, a smart key system, a power window apparatus, or various lamps such as head lamps, tail lamps, brake lamps, turn indicators, and fog lamps. In this case, radio waves or signals of various switches which are transmitted from a portable device that substitutes as a key may be input to the body system control unit 12020. The body system control unit 12020 accepts input of the radio waves or signals and controls a door lock apparatus, the power window apparatus, the lamps, and the like of the vehicle.

The external vehicle information detecting unit 12030 detects information on an exterior of the vehicle that is mounted with the vehicle control system 12000. For example, an imaging portion 12031 is connected to the external vehicle information detecting unit 12030. The external vehicle information detecting unit 12030 causes the imaging portion 12031 to capture an image of the exterior of the vehicle and receives the captured image. Based on the received image, the external vehicle information detecting unit 12030 may perform object detection processing or distance detection processing with respect to people, vehicles, obstacles, signs, letters on road surfaces, and the like.

The imaging portion 12031 is a light sensor which receives light and which outputs an electric signal in accordance with an amount of the received light. The imaging portion 12031 can output the electric signal as an image or as ranging information. In addition, the light received by the imaging portion 12031 may be visible light or invisible light such as infrared light.

The internal vehicle information detecting unit 12040 detects information on an interior of the vehicle. For example, a driver state detecting portion 12041 that detects a state of a driver is connected to the internal vehicle information detecting unit 12040. For example, the driver state detecting portion 12041 includes a camera for capturing an image of the driver and, based on detection information that is input from the driver state detecting portion 12041, the internal vehicle information detecting unit 12040 may calculate a degree of fatigue or a degree of concentration of the driver or may determine whether or not the driver has fallen asleep.

Based on information on the exterior or the interior of the vehicle acquired by the external vehicle information detecting unit 12030 or the internal vehicle information detecting unit 12040, the microcomputer 12051 can calculate a control target value of the drive force generation apparatus, the steering mechanism, or the brake apparatus and output a control command to the drive system control unit 12010. For example, the microcomputer 12051 can perform cooperative control for the purpose of realizing functions of an ADAS (Advanced Driver Assistance System) including collision avoidance or crash mitigation of the vehicle, headway control based on inter-vehicular distance, cruise control, collision warning of the vehicle, and lane departure warning of the vehicle.

In addition, by controlling the drive force generation apparatus, the steering mechanism, the brake apparatus, or the like based on information on a periphery of the vehicle acquired by the external vehicle information detecting unit 12030 or the internal vehicle information detecting unit 12040, the microcomputer 12051 can perform cooperative control for the purpose of automated driving or the like that enables the vehicle to travel autonomously without having to rely on operations by the driver.

Furthermore, based on information on the exterior of the vehicle acquired by the external vehicle information detecting unit 12030, the microcomputer 12051 can output a control command to the body system control unit 12020. For example, the microcomputer 12051 can perform cooperative control for the purpose of controlling the head lamps in accordance with a position of a vehicle ahead or an oncoming vehicle as detected by the external vehicle information detecting unit 12030 and realizing antidazzle by switching a high beam to a low beam or the like.

The audio/video output portion 12052 transmits an output signal of at least one of sound and an image to an output apparatus that is capable of audibly or visually notifying information to an occupant of the vehicle or to the outside of the vehicle. In an example shown in FIG. 17, an audio speaker 12061, a display portion 12062, and an instrument panel 12063 are exemplified as output apparatuses. For example, the display portion 12062 may include at least one of an on-board display and a head-up display.

Figure 18:
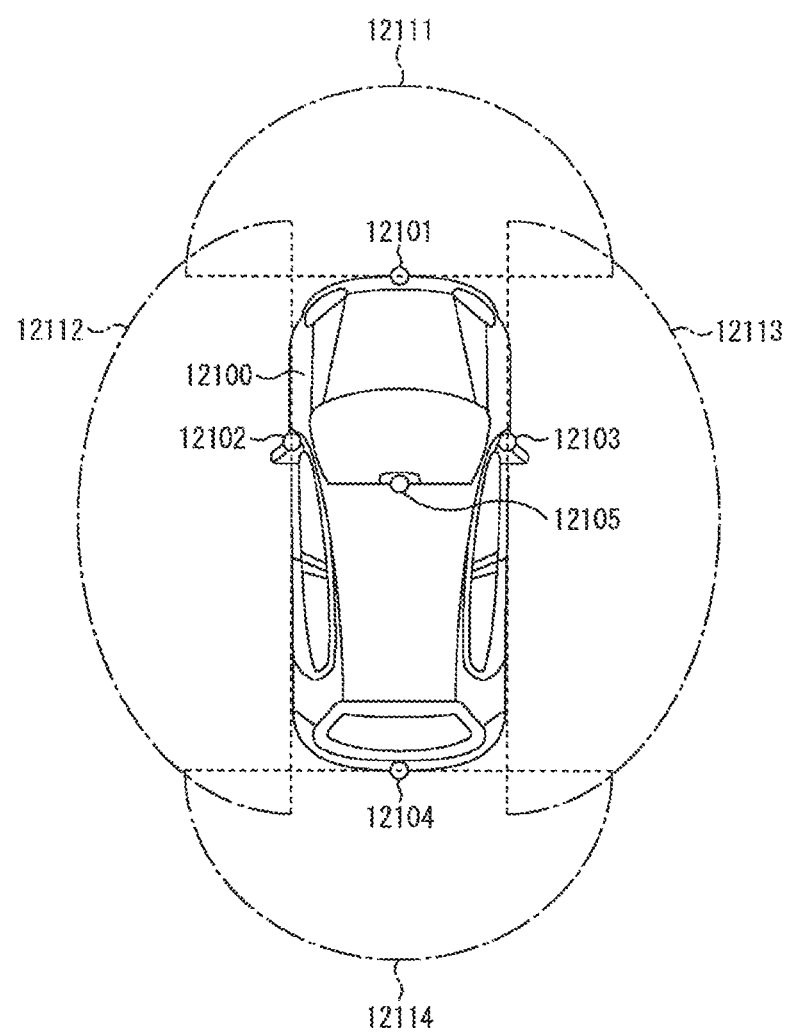
FIG. 18 is an explanatory diagram showing an example of installation positions of an external vehicle information detecting portion and an imaging portion.

FIG. 18 is a diagram showing an example of an installation position of the imaging portion 12031.

In FIG. 18, as the imaging portion 12031, a vehicle 12100 has imaging portions 12101, 12102, 12103, 12104, and 12105.

For example, the imaging portions 12101, 12102, 12103, 12104, and 12105 are provided at positions such as a front nose, side mirrors, a rear bumper, a rear door, and an upper part of a front glass inside a cabin of the vehicle 12100. The imaging portion 12101 that is provided on the front nose and the imaging portion 12105 that is provided in the upper part of the front glass inside the cabin mainly acquire an image of the front of the vehicle 12100. The imaging portions 12102 and 12103 that are provided on the side mirrors mainly acquire an image of the sides of the vehicle 12100. The imaging portion 12104 that is provided on the rear bumper or the rear door mainly acquires an image of the rear of the vehicle 12100. The front image that is acquired by the imaging portions 12101 and 12105 is mainly used to detect vehicles ahead, pedestrians, obstacles, traffic lights, traffic signs, lanes, and the like.

FIG. 18 shows an example of photographic ranges of the imaging portions 12101 to 12104. An imaging range 12111 represents an imaging range of the imaging portion 12101 that is provided on the front nose, imaging ranges 12112 and 12113 respectively represent imaging ranges of the imaging portions 12102 and 12103 that are provided on the side mirrors, and an imaging range 12114 represents an imaging range of the imaging portion 12104 that is provided on the rear bumper or the rear door. For example, by superimposing image data captured by the imaging portions 12101 to 12104, a bird's-eye view image of the vehicle 12100 as viewed from above is obtained.

At least one of the imaging portions 12101 to 12104 may have a function of acquiring distance information. For example, at least one of the imaging portions 12101 to 12104 may be a stereo camera constituted by a plurality of imaging elements or an imaging element having pixels for phase difference detection.

For example, by obtaining a distance to each solid object in the imaging ranges 12111 to 12114 and a temporal variation of the distance (a relative speed with respect to the vehicle 12100) based on the distance information obtained from the imaging portions 12101 to 12104, particularly, the microcomputer 12051 can extract, as a vehicle ahead, a solid object which is closest to the vehicle 12100 on a path of the vehicle 12100 and which is traveling at a predetermined speed (for example, 0 km/h or higher) in approximately the same direction as the vehicle 12100. In addition, the microcomputer 12051 can set an inter-vehicular distance to be secured in advance behind a vehicle ahead and perform automatic brake control (including cruise stop control), automatic acceleration control (including cruise start control), and the like. As described above, cooperative control for the purpose of automated driving or the like that enables autonomous travel without having to rely on operations by the driver can be performed.

For example, based on the distance information obtained from the imaging portions 12101 to 12104, the microcomputer 12051 can extract solid object data related to solid objects by classifying the solid objects into motorcycles, ordinary vehicles, large vehicles, pedestrians, utility poles, and other solid objects and use the solid object data for automatic obstacle avoidance. For example, the microcomputer 12051 distinguishes obstacles around the vehicle 12100 between obstacles that are visible from the driver of the vehicle 12100 and obstacles that are hardly visible. In addition, the microcomputer 12051 can perform driving support for collision avoidance by determining a collision risk that indicates a degree of danger of a collision with each obstacle, and in a situation where the collision risk is equal to or higher than a set value and where there is a possibility of a collision, issuing a warning to the driver via the audio speaker 12061 or the display portion 12062 or performing forced braking or evasive steering via the drive system control unit 12010.

At least one of the imaging portions 12101 to 12104 may be an infrared camera that detects infrared light. For example, the microcomputer 12051 can recognize a pedestrian by determining whether or not a pedestrian is present in a captured image of the imaging portions 12101 to 12104. The recognition of a pedestrian is performed by a step of extracting a feature point in a captured image of the imaging portions 12101 to 12104 as an infrared camera and a step of performing pattern matching on a series of feature points indicating a contour of an object to determine whether or not the object is a pedestrian. When the microcomputer 12051 determines that a pedestrian is present in a captured image of the imaging portions 12101 to 12104 and recognizes the pedestrian, the audio/video output portion 12052 controls the display portion 12062 so that a rectangular contour line for highlighting is superimposed and displayed on the recognized pedestrian. In addition, the audio/video output portion 12052 may control the display portion 12062 so that an icon or the like which represents a pedestrian is displayed at a desired position.

This concludes the description of an example of a vehicle control system to which the technique according to the present disclosure may be applied. The technique according to the present disclosure may be applied to the imaging portion 12031 among the configuration described above. By applying the technique according to the present disclosure to the imaging portion 12031, since a focal length can be adjusted at a higher speed and a clearer photographed image can be obtained, fatigue of a driver can be reduced.

OTHER EMBODIMENTS

While the present technique has been described above in the form of an embodiment, it is not to be understood that the descriptions and drawings that constitute parts of the disclosure limit the present technique. It is to be understood that various alternative embodiments, examples, and operable techniques will become apparent from the disclosure to those skilled in the art.

For example, a case where the movable part (11, 12, and 13) is constituted by the lens unit 11, the lens tube 12, and the first coil 13 has been exemplified in the embodiment of the present technique. However, the movable part may be configured to include the first coil 13 but not the lens unit 11 nor the lens tube 12. In other words, the present technique is applicable to any movable part as long as the movable part requires positioning and the first coil 13 can be attached thereto.

As described above, the present technique obviously includes various embodiments and the like that are not described herein. Therefore, the technical scope of the present technique is to be determined solely by matters specifying the invention according to the scope of claims that is reasonable from the description presented above.

The present technique can also be configured as follows.

(1)

A lens module, including:

a lens;

a lens tube which has a central axis that is parallel to an optical axis of the lens and which is configured to hold the lens inside;

a casing configured to house the lens tube inside;

a first coil which is provided so as to circle around an outer circumferential surface of the lens tube;

a magnet which is provided on an inner circumferential surface of the casing so as to oppose the first coil; and a second coil which is provided so as to circle around the inner circumferential surface of the casing.

(2)

The lens module according to (1), wherein the lens tube is configured to move along the optical axis between a first state where the lens tube has moved closest to a subject and a second state where the lens tube has moved furthest to the subject in an opposite side to the subject, and a distance in the optical axis direction between the first coil and the second coil in the first state is smaller than a distance in the optical axis direction between the first coil and the second coil in the second state.

(3)

The lens module according to (1), wherein the second coil is positioned closer to the subject side than to the magnet in the optical axis direction.

(4)

The lens module according to (1), wherein the second coil is positioned on an opposite side to a subject side than the magnet in the optical axis direction.

(5)

The lens module according to (1), wherein the magnet is divided in plurality in the optical axis direction, and the second coil is provided between the plurality of divided magnets.

(6)

The lens module according to (1), wherein the second coil is provided in plurality in the optical axis direction.

(7)

The lens module according to any one of (1) to (6), wherein in a movable region along the optical axis of the lens tube, the second coil and the first coil oppose each other in a direction that is perpendicular to the optical axis.

(8)
A camera module, including:
a lens;
a lens tube which has a central axis that is parallel to an optical axis of the lens and which is configured to hold the lens inside;
a casing configured to house the lens tube inside;
a first coil which is provided so as to circle around an outer circumferential surface of the lens tube;
a magnet which is provided on an inner circumferential surface of the casing so as to oppose the first coil;
a second coil which is provided so as to circle around the inner circumferential surface of the casing; and
an imaging element which is arranged on the optical axis and which is configured to convert light having been transmitted through the lens into an electric signal.

(9)
An electronic device, including:
a lens;
a lens tube which has a central axis that is parallel to an optical axis of the lens and which is configured to hold the lens inside;
a casing configured to house the lens tube inside;
a first coil which is provided so as to circle around an outer circumferential surface of the lens tube;
a magnet which is provided on an inner circumferential surface of the casing so as to oppose the first coil;
a second coil which is provided so as to circle around the inner circumferential surface of the casing;
an imaging element which is arranged on the optical axis and which is configured to convert light having been transmitted through the lens into an electric signal; and
a control portion which is configured to supply a current to the first coil and to control a position of the lens along the optical axis based on an induced electromotive force of the second coil.

(10)
A lens drive method, including the steps of:
in accordance with a magnetic interaction between a first coil which is provided so as to circle around an outer circumferential surface of a lens tube that holds a lens inside and a magnet which is provided so as to oppose the first coil on an inner circumferential surface of a casing that holds the lens tube inside, moving the lens tube along an optical axis of the lens;
detecting an induced electromotive force of a second coil that is provided so as to circle around the inner circumferential surface of the casing; and
controlling a current value to be supplied to the first coil based on the detected induced electromotive force.

REFERENCE SIGNS LIST

1 Lens module
2 Imaging module
3 Camera module
4 Image signal processing portion
5, 5x Control portion
11a, 11b, 11c Lens
12 Lens tube
13 First coil
14 Casing
15, 15a, 15b, 15c, 15d Magnet
16, 17 Second coil
21 Substrate
22 Imaging element
23 Cover holder
24 Cover glass

The invention claimed is:

1. A lens module, comprising:
a lens;
a lens tube, wherein
a central axis of the lens tube is parallel to an optical axis of the lens, and
the lens tube is configured to hold the lens inside;
a casing configured to house the lens tube inside;
a first coil around an outer circumferential surface of the lens tube;
a magnet on an inner circumferential surface of the casing, wherein
the magnet is opposite to the first coil,
the magnet is divided in plurality in a direction of the optical axis, and
the lens tube is configured to move in a direction along the optical axis based on a magnetic interaction between the first coil and the magnet when a current is supplied to the first coil; and
a second coil around the inner circumferential surface of the casing, wherein
the second coil is between the plurality of divided magnets, and
the second coil is configured to detect a position of the lens along the optical axis based on an induced electromotive force generated on the second coil when the current is supplied to the first coil.

2. The lens module according to claim 1, wherein
the lens tube is further configured to move in the direction along the optical axis between a first state where the lens tube has moved closest to a subject and a second state where the lens tube has moved furthest to the subject in an opposite side to the subject, and
a distance in the optical axis direction between the first coil and the second coil in the first state is smaller than a distance in the optical axis direction between the first coil and the second coil in the second state.

3. The lens module according to claim 1, wherein the second coil is positioned closer to a subject than to the magnet in the direction of the optical axis.

4. The lens module according to claim 1, wherein the second coil is positioned on an opposite side to a subject side than the magnet in the direction of the optical axis.

5. The lens module according to claim 1, further comprising a plurality of second coils around the inner circumferential surface of the casing, wherein
a first coil of the plurality of second coils is above the magnet in the direction of the optical axis, and
a second coil of the plurality of second coils is below the magnet in the direction of the optical axis.

6. The lens module according to claim 1, wherein in a movable region along the optical axis of the lens tube, the second coil and the first coil oppose each other in a direction perpendicular to the optical axis.

7. A camera module, comprising:
a lens;
a lens tube, wherein
a central axis of the lens tube is parallel to an optical axis of the lens, and
the lens tube is configured to hold the lens inside;
a casing configured to house the lens tube inside;
a first coil around an outer circumferential surface of the lens tube;
a magnet on an inner circumferential surface of the casing, wherein
the magnet is opposite to the first coil, the magnet is divided in plurality in a direction of the optical axis, and the lens tube is configured to move in a direction along the optical axis based on a magnetic interaction between the first coil and the magnet when a current is supplied to the first coil;

a second coil around the inner circumferential surface of the casing, wherein the second coil is between the plurality of divided magnets, and the second coil is configured to detect a position of the lens along the optical axis based on an induced electromotive force generated on the second coil when the current is supplied to the first coil; and an imaging element on the optical axis, wherein the imaging element is configured to convert light transmitted through the lens into an electric signal.

8. An electronic device, comprising:

a lens;

a lens tube, wherein a central axis of the lens tube is parallel to an optical axis of the lens, and the lens tube is configured to hold the lens inside;

a casing configured to house the lens tube inside;

a first coil around an outer circumferential surface of the lens tube;

a magnet on an inner circumferential surface of the casing, wherein the magnet is opposite to the first coil, the magnet is divided in plurality in a direction of the optical axis, and the lens tube is configured to move in a direction along the optical axis based on a magnetic interaction between the first coil and the magnet when a current is supplied to the first coil;

a second coil around the inner circumferential surface of the casing, wherein the second coil is between the plurality of divided magnets, and the second coil is configured to detect a position of the lens based on an induced electromotive force generated on the second coil when the current is supplied to the first coil;

an imaging element on the optical axis, wherein the imaging element is configured to convert light transmitted through the lens into an electric signal; and a control portion configured to:

control supply of the current to the first coil; and control the position of the lens along the optical axis based on the induced electromotive force generated on the second coil.

9. A lens drive method, comprising:

moving a lens tube along an optical axis of a lens based on a magnetic interaction between a first coil and a magnet opposite to the first coil when a current is supplied to the first coil, wherein the first coil is around an outer circumferential surface of the lens tube, the lens tube is configured to hold the lens inside, the magnet is on an inner circumferential surface of a casing configured to hold the lens tube inside, and the magnet is divided in plurality in a direction of the optical axis;

detecting an induced electromotive force generated on a second coil around the inner circumferential surface of the casing; and controlling the current supplied to the first coil based on the detected induced electromotive force.

\* \* \* \* \*